United States Patent
Vulkan et al.

(10) Patent No.: US 11,820,222 B2
(45) Date of Patent: Nov. 21, 2023

(54) FLOAT VALVE

(71) Applicant: RAVAL A.C.S. LTD., Beer-Sheva (IL)

(72) Inventors: Omer Vulkan, D.N. Hanegev (IL); Denis Kleyman, Mabu'im (IL); Anton Kuminov, Ashalim (IL)

(73) Assignee: RAVAL A.C.S. LTD., Beer-Sheva (IL)

( * ) Notice: Subject to any disclaimer, the term of this patent is extended or adjusted under 35 U.S.C. 154(b) by 366 days.

(21) Appl. No.: 16/481,593

(22) PCT Filed: Feb. 13, 2018

(86) PCT No.: PCT/IL2018/050164
§ 371 (c)(1),
(2) Date: Jul. 29, 2019

(87) PCT Pub. No.: WO2018/150419
PCT Pub. Date: Aug. 23, 2018

(65) Prior Publication Data
US 2020/0001703 A1    Jan. 2, 2020

Related U.S. Application Data

(60) Provisional application No. 62/458,587, filed on Feb. 14, 2017.

(51) Int. Cl.
*B60K 15/035* (2006.01)
*B60K 15/03* (2006.01)
*G05D 9/02* (2006.01)

(52) U.S. Cl.
CPC ......... *B60K 15/03504* (2013.01); *G05D 9/02* (2013.01); *B60K 2015/03289* (2013.01)

(58) Field of Classification Search
CPC .... B60K 15/03504; B60K 2015/03289; G05D 9/02; F16K 24/044; F16K 24/042
(Continued)

(56) References Cited

U.S. PATENT DOCUMENTS 5,392,804 A    2/1995  Kondo et al.
5,782,262 A *  7/1998  Kim ................. B60K 15/03519
                                                        137/202
(Continued)

FOREIGN PATENT DOCUMENTS

CN    1349598 A    5/2002
CN    101014480 A    8/2007
(Continued)

OTHER PUBLICATIONS

International Search Report and Written Opinion from International Application No. PCT/IL2018/050164 dated Jun. 21, 2018.

*Primary Examiner* — Angelisa L. Hicks
(74) *Attorney, Agent, or Firm* — Dorsey & Whitney LLP

(57) ABSTRACT

A float valve (10) is provided for use with a liquid medium, the float valve having an upright configuration and an inverted configuration. The float valve includes: a housing (12), defining at least one inlet port (20) and at least one outlet port (24); a float assembly (60) movable within the housing; and an auxiliary float member (50) movable within said housing. The float assembly (60) comprises a primary float member (70; 70'), different from the auxiliary float member, and a spring element (80). The primary in float member is configured for closing the at least one outlet port when in abutment therewith, the spring element being configured for providing a biasing spring force to the primary float member in a direction towards said at least one outlet port. The auxiliary float member is configured for providing a net upthrust force with respect to the liquid medium under submerged conditions irrespective of whether the float valve is in said upright configuration or in said inverted configuration.

21 Claims, 14 Drawing Sheets

(58) Field of Classification Search
USPC .................. 137/423, 429–433, 202, 587
See application file for complete search history.

(56) References Cited

U.S. PATENT DOCUMENTS

| | | | |
|---|---|---|---|
| 6,145,532 | A | 11/2000 | Tuckey et al. |
| 6,591,855 | B2 * | 7/2003 | Nishi ............... B60K 15/03519 137/202 |
| 7,934,514 | B2 * | 5/2011 | Yamada ................ F16K 24/044 137/202 |
| 2005/0161085 | A1 * | 7/2005 | Haunhorst ................ F15B 1/26 137/202 |
| 2006/0065305 | A1 | 3/2006 | Nojiri et al. |

FOREIGN PATENT DOCUMENTS

| | | |
|---|---|---|
| CN | 103016809 A | 4/2013 |
| CN | 103097163 A | 5/2013 |
| JP | 2002285929 A | 10/2002 |
| JP | 2005127328 A | 5/2005 |
| JP | 2013095339 A | 5/2013 |
| RU | 2245474 C2 | 1/2005 |
| WO | 0053960 A1 | 9/2000 |

* cited by examiner

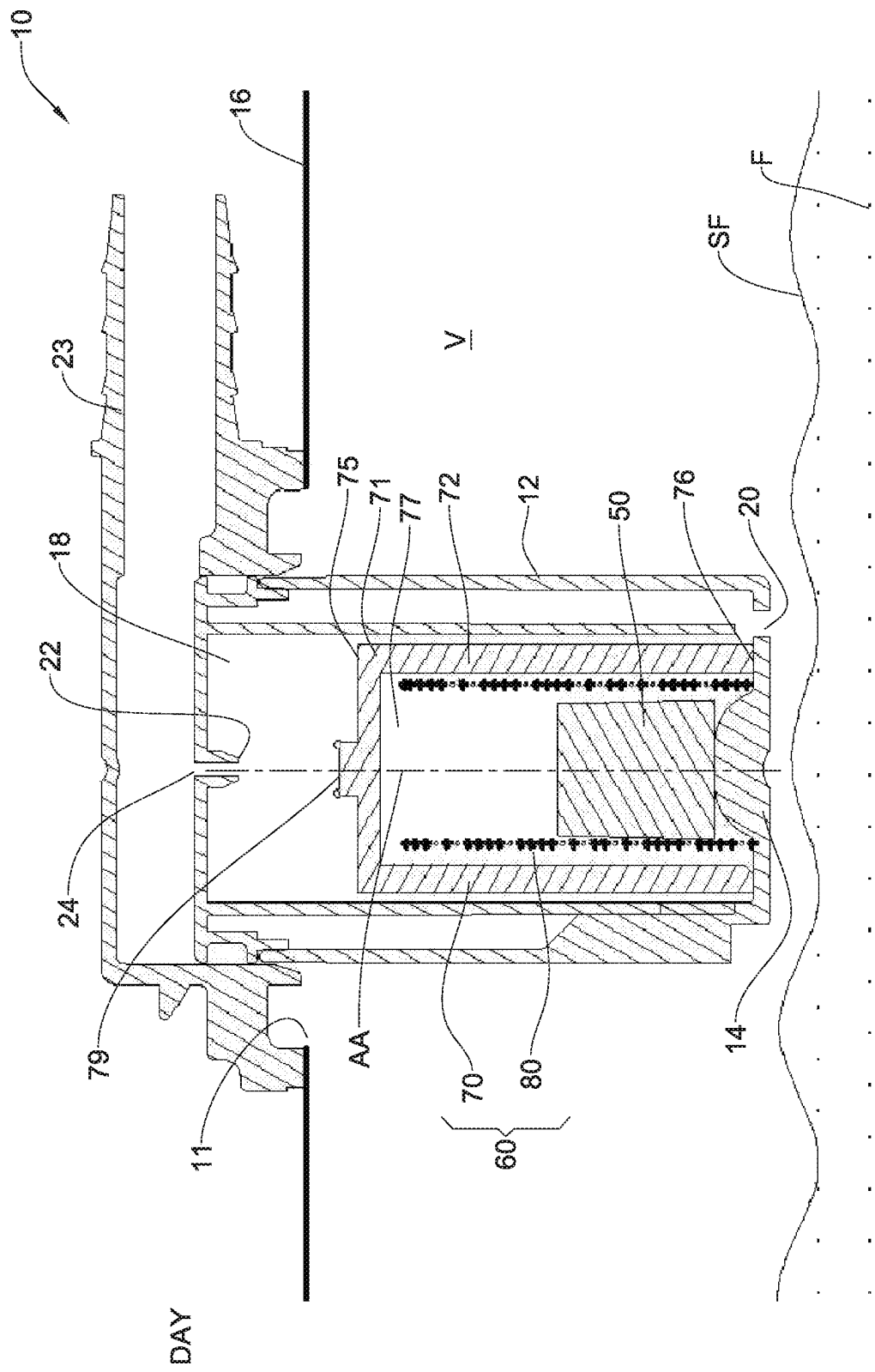

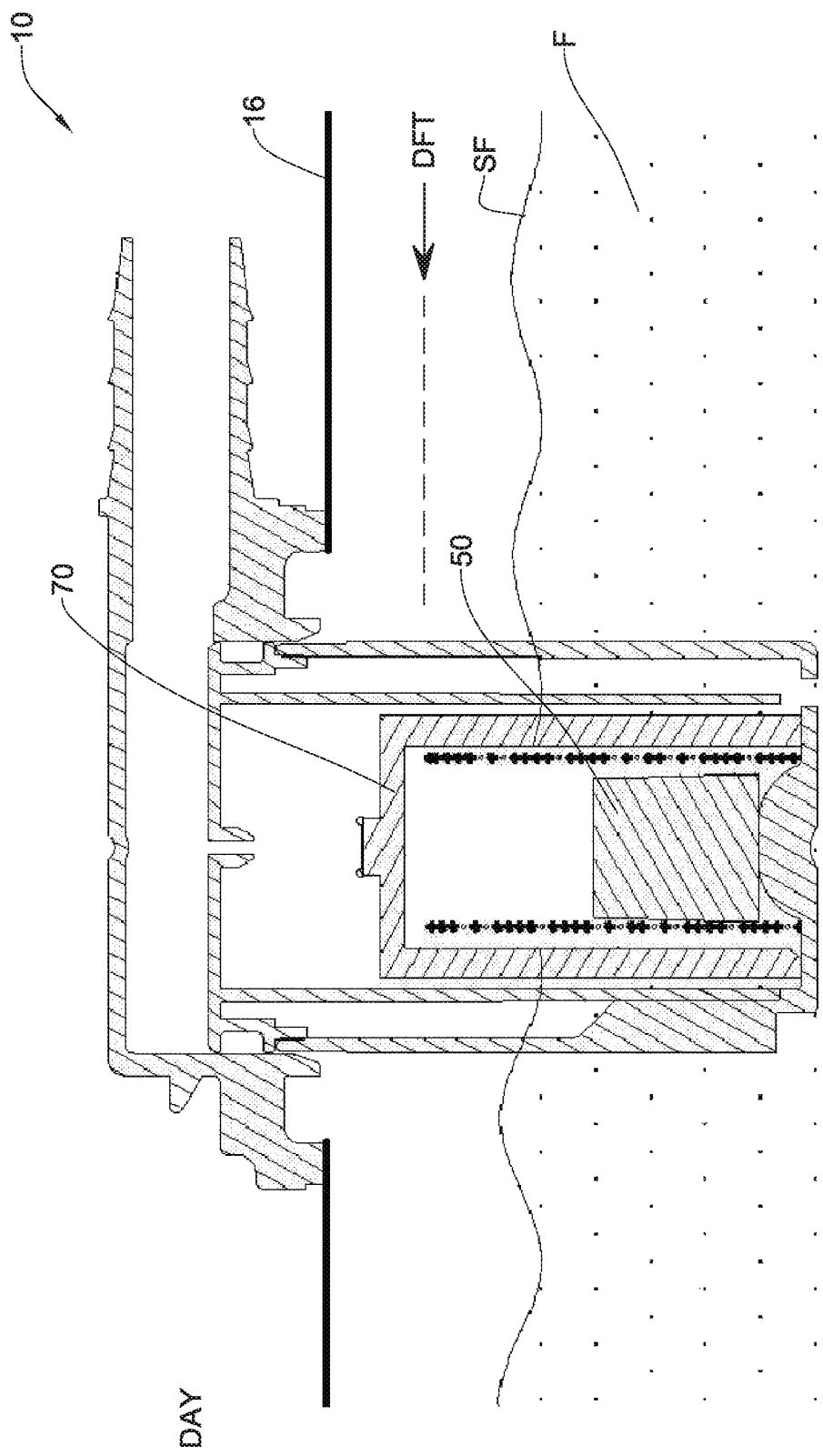

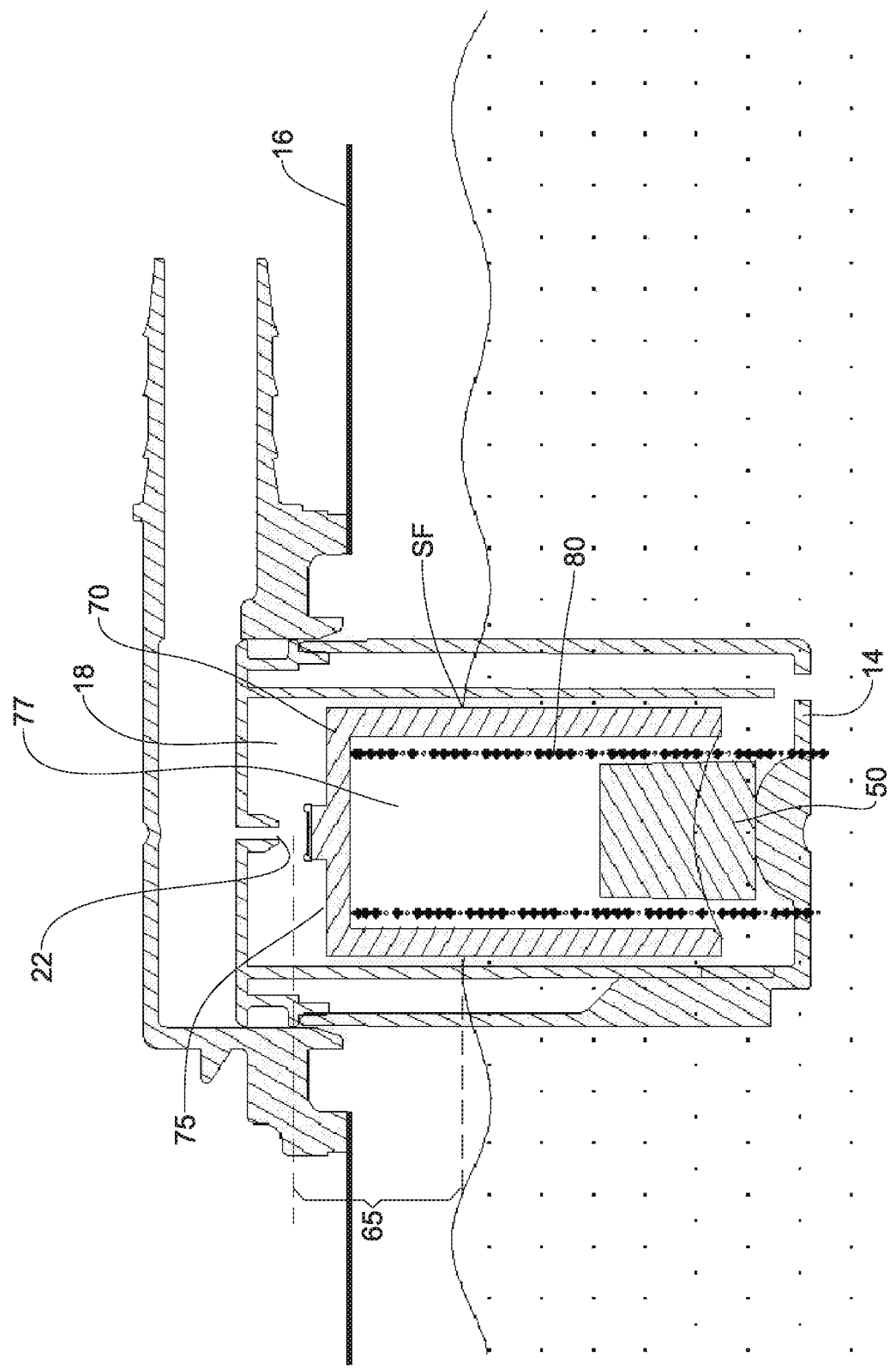

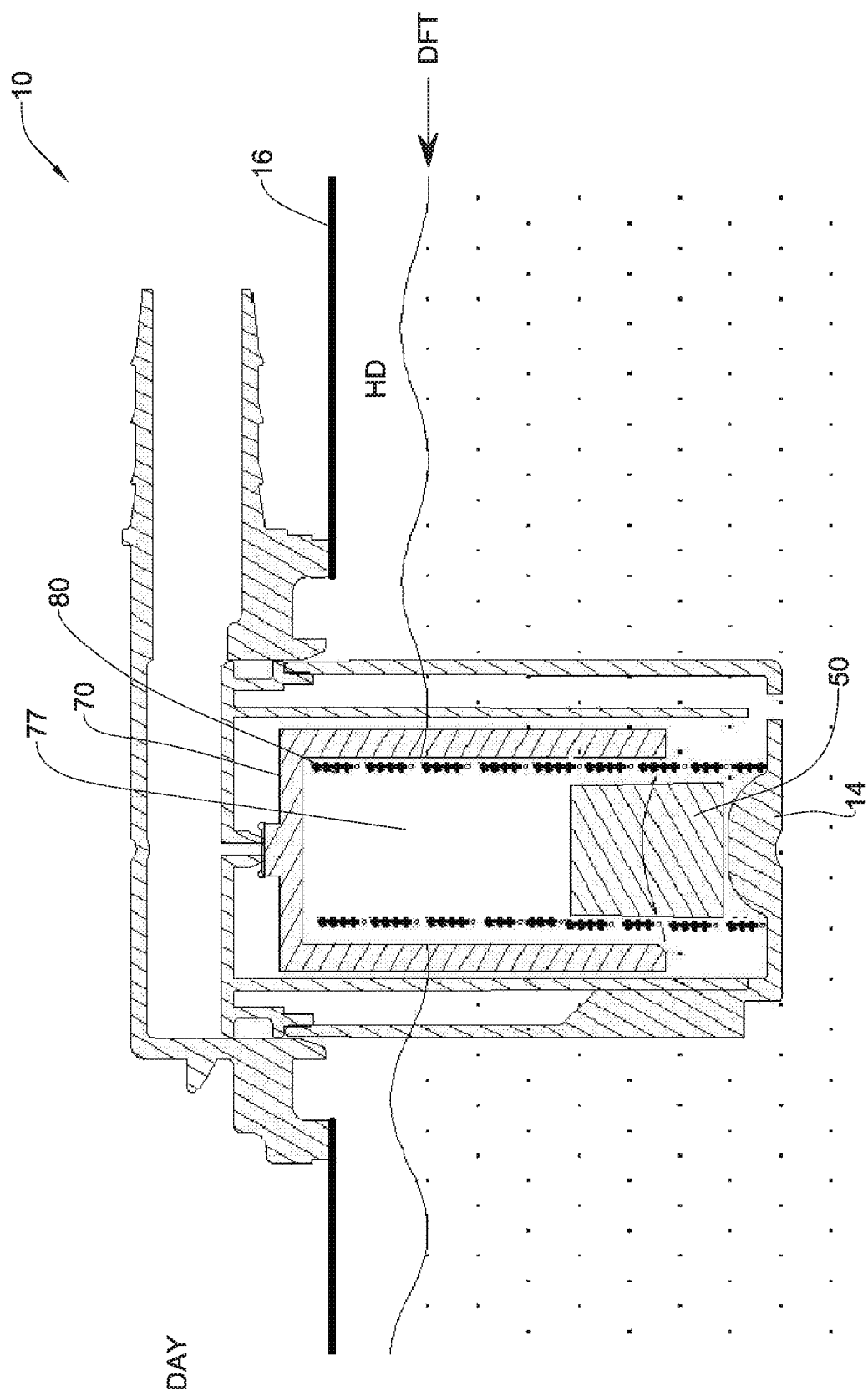

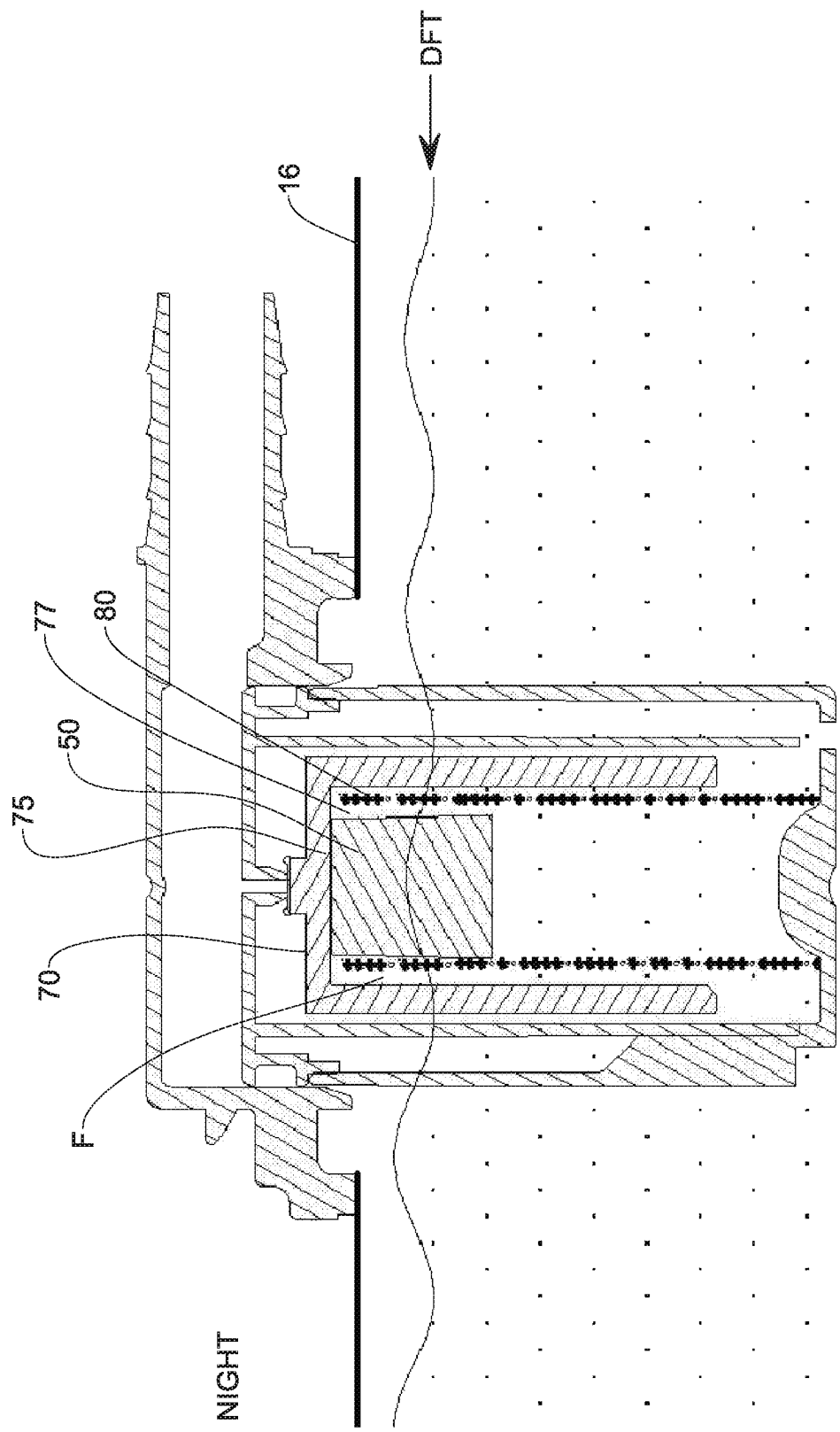

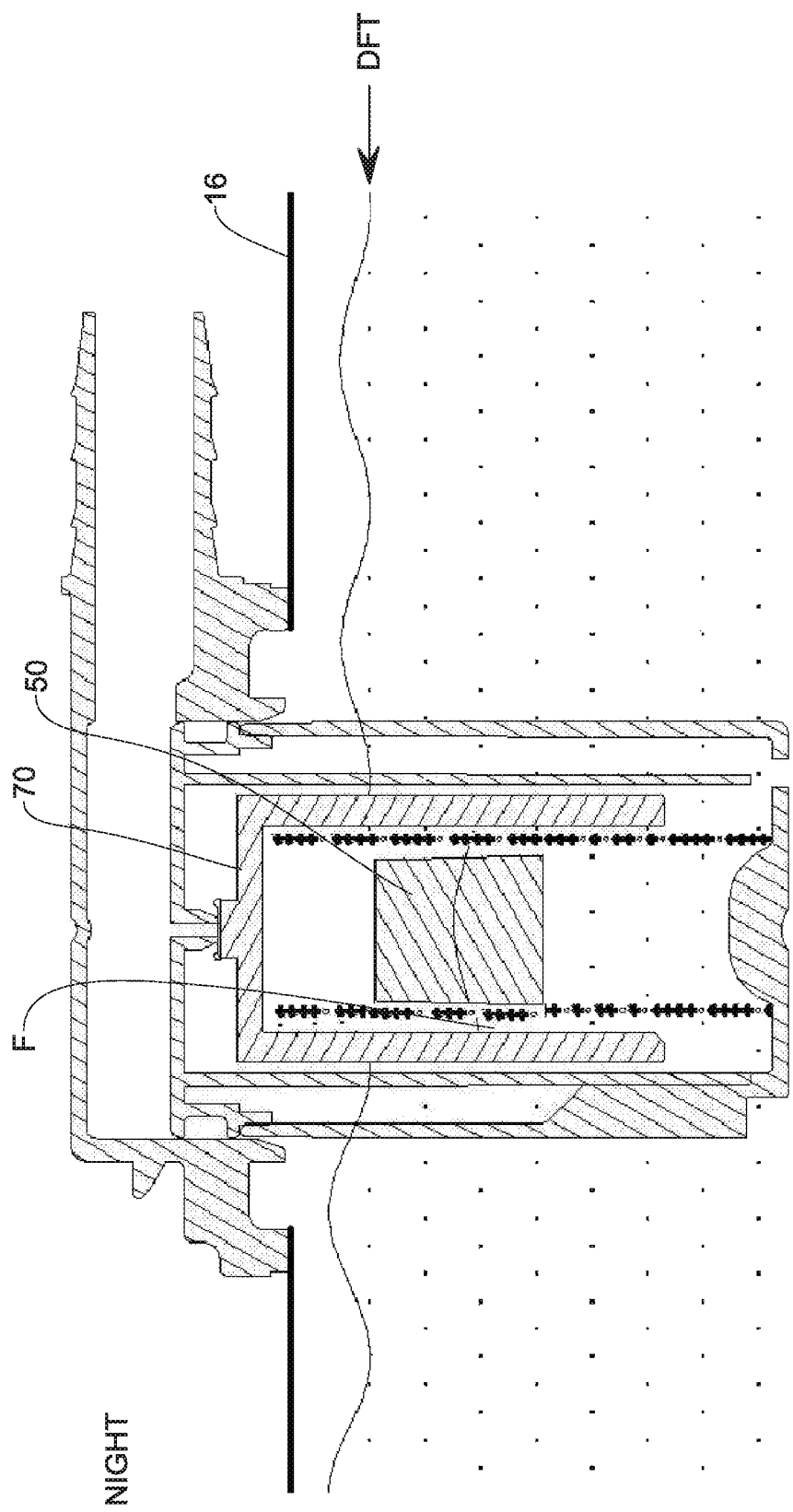

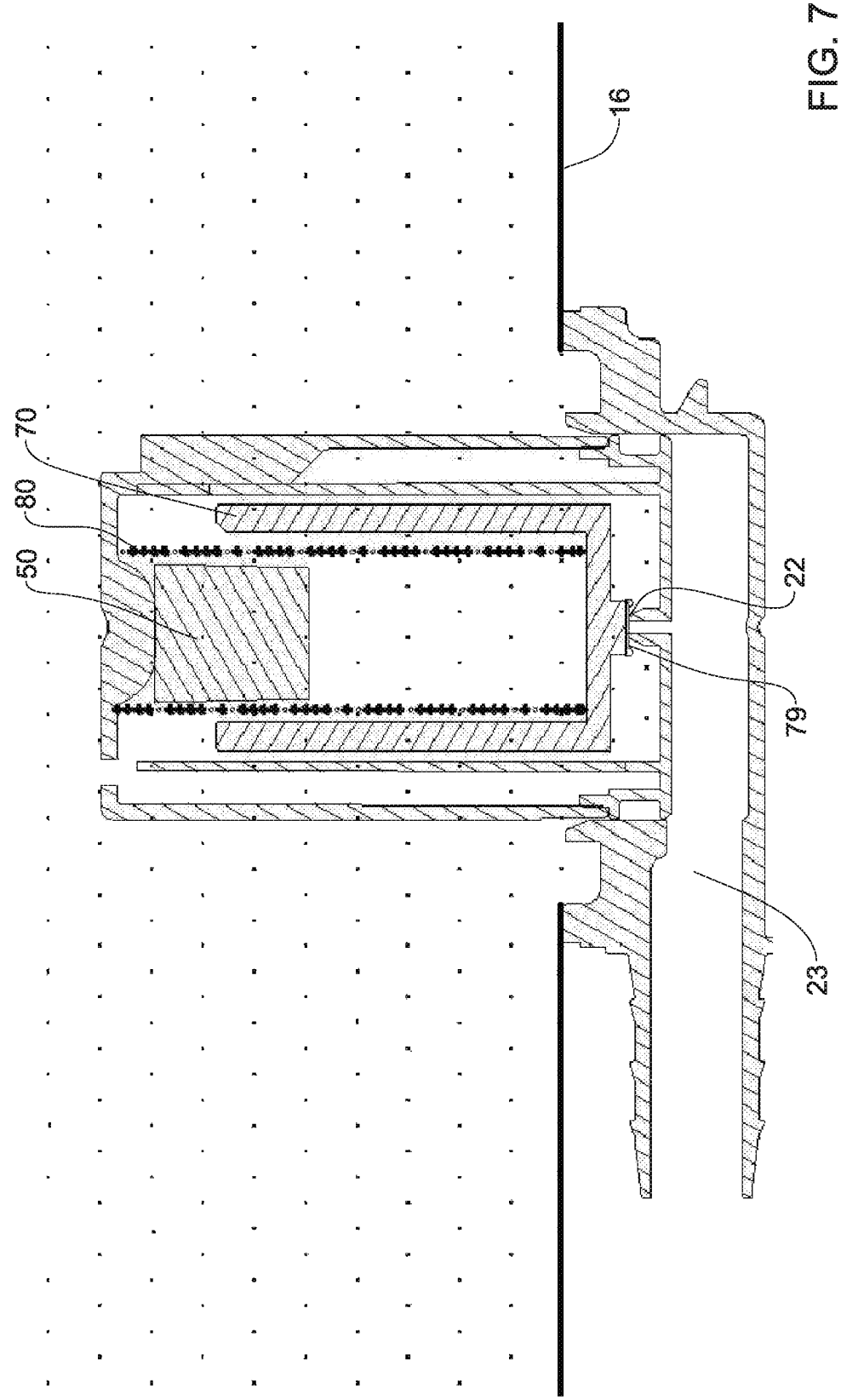

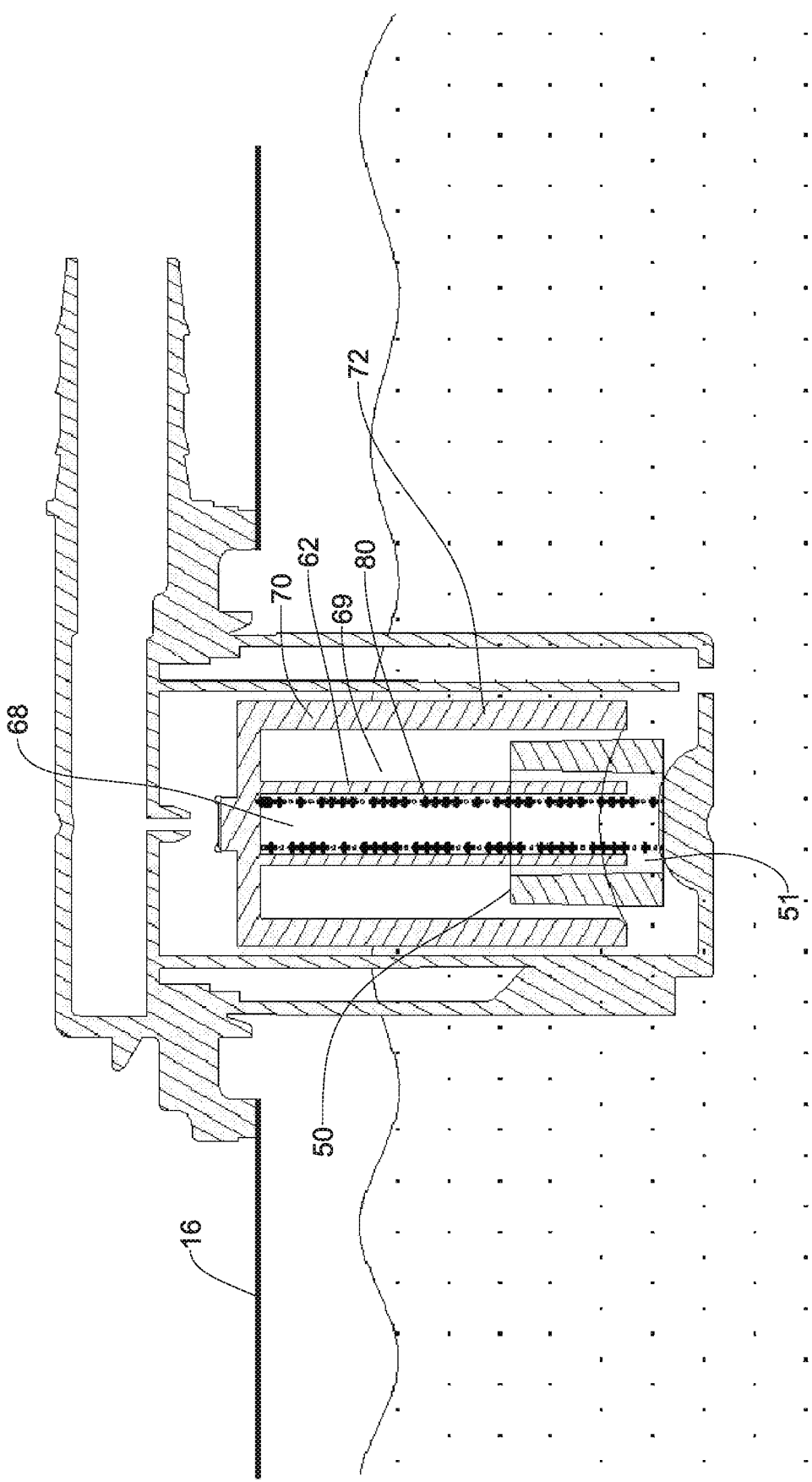

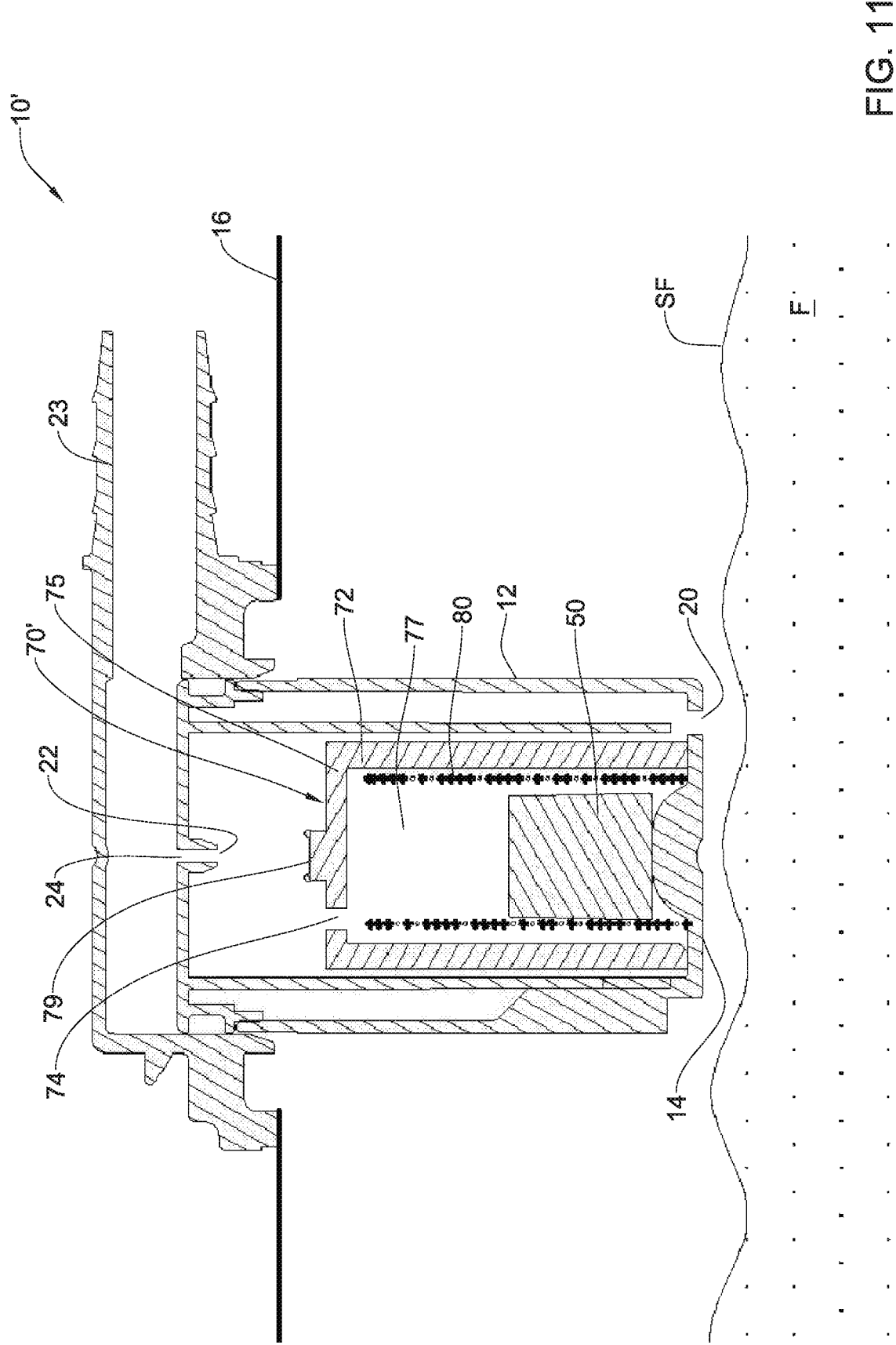

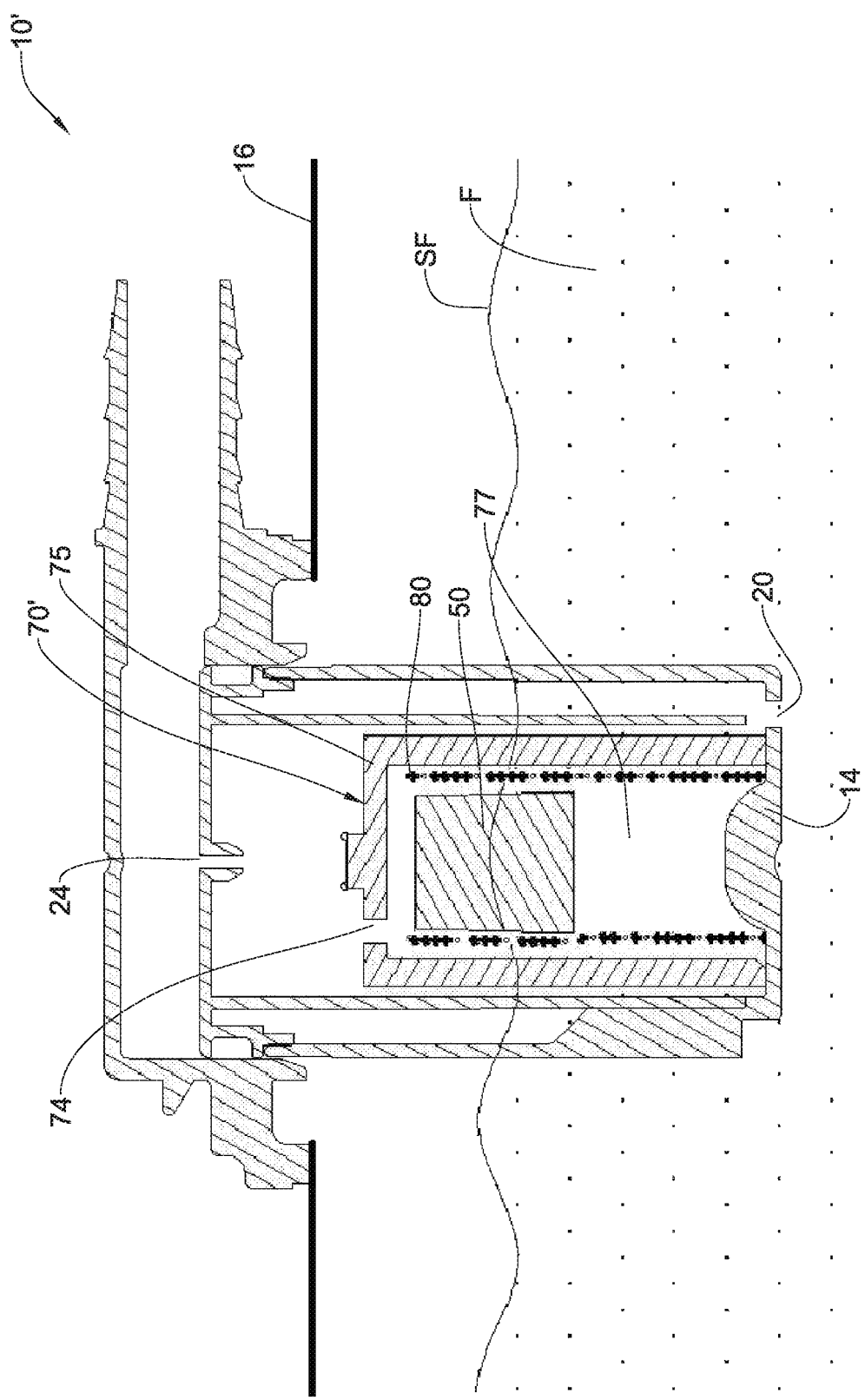

FLOAT VALVE

TECHNOLOGICAL FIELD

The presently disclosed subject matter relates to float valves in general and in particular to float valves for use in vehicle fuel tanks.

BACKGROUND ART

References considered to be relevant as background to the presently disclosed subject matter are listed below:

WO 2000/53960

Acknowledgement of the above references herein is not to be inferred as meaning that these are in any way relevant to the patentability of the presently disclosed subject matter.

BACKGROUND

Float valves are well known, particularly for use in vehicle fuel tanks. Such float valves are commonly used as over-filling interdiction valves and/or as rollover valves, which are used for venting fuel vapor on the one hand when open, and on the other hand respectively operate to prevent over filling of the fuel tank and/or prevent leakage of fuel therethrough, for example in a roll-over scenario or in other conditions where the valve is partially or fully submerged in the fuel. Such conditions can include, for example, tilting of the fuel tank (for example the vehicle travelling uphill or downhill), or when fuel is moving within the tank (for example liquid sloshing occurring in the tank) causing crests and troughs in the level of fuel in the tank.

Conventional float valves use the buoyancy and spring force of a spring biased, open-bottomed float member to urge the float member in an upward direction and close the valve under conditions in which the float valve is partially or fully submerged in the fuel, and potentially could otherwise result in fuel leakage through the valve. In roll-over conditions the now-inverted float member provides little or no net buoyancy force, and instead the weight thereof (often also including the weight of fuel included in the now-inverted float member), together with the spring bias urges the valve to the closed position, preventing fuel leakage.

In regular use of such a valve, the open space provided by the open-bottom float member fills up with fuel vapor, and provides the required net buoyancy force to the float member, which together with the biasing spring force provided by the spring, prevents overfilling of, or spillage from, the fuel tank. However, as the environmental temperature drops (for example at night), the fuel vapor can condense and thus the open space can end up being partially or fully filled with liquid fuel, significantly reducing the effective net buoyancy force of the float member to less than the aforesaid required net buoyancy force. This can affect the effectiveness of the float valve in its function as an over-filling interdiction valve or in preventing spillage, under these conditions.

By way of non-limiting example, WO 2000/53960 discloses an over filling and roll over valve including a housing, in which a valve assembly is located. The valve assembly includes a first stage member and a second stage member, being coaxially and relatively displaceable within the housing. The first stage member has a slit-like aperture at a bottom and an outlet aperture at the top. The inlet and the outlet apertures are in flow communication. The second stage member is a float provided with a flexible membrane strip for closing the slit-like aperture of the first stage member. The valve assembly is provided with at least one anchoring member extending between the first stage member and the second stage member and permitting a limited freedom of relative movement therebetween in such a manner that displacement of the second stage member into its second position entails positive displacement of the first stage member into its second position.

GENERAL DESCRIPTION

According to an aspect of the presently disclosed subject matter there is provided a float valve for use with a liquid medium, the float valve having an upright configuration and an inverted configuration, and comprising:

a housing, defining at least one inlet port and at least one outlet port;

a float assembly movable within said housing; and an auxiliary float member movable within said housing;

wherein the float assembly comprises a primary float member, different from said auxiliary float member, and a spring element, the primary float member configured for closing said at least one outlet port when in abutment therewith, the spring element being configured for providing a biasing spring force to the primary floating member in a direction towards said at least one outlet port;

wherein said auxiliary float member is configured for providing a net upthrust force with respect to the liquid medium under submerged conditions irrespective of whether the float valve is in said upright configuration or in said inverted configuration.

For example, said primary float member comprises a float chamber accommodating said auxiliary float member.

In at least one example, said float chamber is open at a bottom end thereof and closed at a top end thereof. For example, said float assembly is configured for selectively operating in a first upright mode, wherein under said submerged conditions: in said first upright mode the float valve is in said upright configuration and the float assembly is configured for closing said at least one outlet port in the absence of any upthrust than can be provided by the auxiliary float member. Additionally or alternatively, for example, said float assembly is configured for selectively operating in a second upright mode, wherein under said submerged conditions: in said second upright mode the float valve is in said upright configuration, said float chamber is filled with the liquid medium at least past a threshold level, and said float assembly is configured for closing said at least one outlet port using said upthrust provided by the auxiliary float member. Additionally or alternatively, for example, said float assembly is configured for selectively operating in an inverted mode, wherein under said submerged conditions: in said inverted mode the float valve is in said inverted configuration and the float assembly is configured for closing said at least one outlet port in the absence of any upthrust than can be provided by the auxiliary float member. Additionally or alternatively, for example, said float assembly is configured for selectively and alternately operating in said first upright mode, in said second upright mode, and in said inverted mode.

In at least another example, said float chamber is open at a bottom end thereof and further comprises at least one opening at a top end thereof. For example, float assembly is configured for selectively operating in a first upright mode, wherein under said submerged conditions: in said first upright mode the float valve is in said upright configuration, said float chamber is filled with the liquid medium at least past a threshold level, and said float assembly is configured for closing said at least one outlet port using said upthrust provided by the auxiliary float member. Additionally or alternatively, for example, said float assembly is configured for selectively operating in an inverted mode, wherein under said submerged conditions: in said inverted mode the float valve is in said inverted configuration and the float assembly is configured for closing said at least one outlet port in the absence of any upthrust than can be provided by the auxiliary float member. Additionally or alternatively, for example, said float assembly is configured for selectively and alternately operating in said first upright mode, and in said inverted mode.

In at least the above or other examples, said auxiliary float member is reciprocally movable within said float chamber.

Additionally or alternatively, for example, said auxiliary float member has an overall density lower than a density of the liquid medium. For example, the auxiliary float member is formed as a solid body made from one or more materials wherein said overall density of the auxiliary float member is lower than the density of the liquid medium. Alternatively, for example, the auxiliary float member is formed as a sealed hollow body including an outer skin defining an internal volume, and wherein there is an absence of fluid communication between said internal volume and an outside of the auxiliary float member, wherein said overall density of the auxiliary float member is lower than the density of the liquid medium. For example, the internal volume comprises a low density material. For example, said low density material is any one of a gas, liquid, solid or foam having a material density significantly less than the density of the liquid medium.

Additionally or alternatively, for example, said primary float member, in the absence of said spring element and concurrently including an air pocket in said float chamber, is not buoyant with respect to the liquid medium.

Additionally or alternatively, for example, said primary float member, in the absence of said spring element and concurrently including an air pocket in said float chamber, becomes completely submerged in the liquid medium.

Additionally or alternatively, for example, said primary float member, in the absence of said spring element and concurrently including an air pocket in the said float chamber is buoyant with respect to the liquid medium.

Additionally or alternatively, for example, said float assembly, including said primary float member and spring element, is configured for enabling said primary float member to assume a floating configuration on a liquid medium when the float valve is in said first upright mode. For example, said float assembly, including said primary float member and said spring element, is further configured for not providing said floating configuration on the liquid medium, when the float valve is in said inverted mode. Additionally or alternatively, for example, said float valve is configured such that, when a maximum said upthrust acts on the primary float member, said maximum upthrust together with said biasing spring force provided by the spring element are together sufficiently greater than a weight of the primary float member, to thereby allow the float member to assume the floating configuration. Additionally or alternatively, for example, said float assembly is configured such that, when a maximum said upthrust acts on the primary float member, said maximum upthrust together with said biasing spring force provided by the spring element are together sufficiently greater than a weight of the primary float member, to thereby allow the float member to assume the floating configuration. Additionally or alternatively, for example, said maximum upthrust is provided as a result of the primary float member being freely sufficiently submerged in the liquid medium such that the maximum upthrust is acting on the primary float member. Additionally or alternatively, for example, said maximum upthrust is a minimum upthrust force or buoyancy force acting on the primary float member corresponding to a submerged volume of the primary float member plus at least a threshold volume of air or vapor trapped in the float chamber of the primary float member.

Additionally or alternatively, for example, said spring element is in the form of a coiled spring.

According to this aspect of the presently disclosed subject matter there is also provided a fuel tank for a vehicle, including a float valve as defined herein.

According to this aspect of the presently disclosed subject matter there is also provided a vehicle including a fuel tank having a float valve as defined herein. For example, the vehicle can be a road vehicle.

BRIEF DESCRIPTION OF THE DRAWINGS

In order to better understand the subject matter that is disclosed herein and to exemplify how it can be carried out in practice, examples will now be described, by way of non-limiting example only, with reference to the accompanying drawings, in which:

FIG. 1 illustrates in cross-sectional side view a first example of a float valve according to the presently disclosed subject matter, the float valve being in upright configuration and open, the float valve not being submerged.

FIG. 2 illustrates in cross-sectional side view the example of FIG. 1, the float valve being in upright configuration and open, the float valve being partially submerged.

FIG. 3 illustrates in cross-sectional side view the example of FIG. 1, the float valve being in upright configuration and open, the float valve being partially submerged, the primary float member floating on liquid medium.

FIG. 4 illustrates in cross-sectional side view the example of FIG. 1, the float valve being in upright configuration and closed, the float valve being partially or fully submerged.

FIG. 5 illustrates in cross-sectional side view the example of FIG. 1, the float valve being in upright configuration and closed, the float valve being partially or fully submerged, the auxiliary float member providing upthrust to the primary float member.

FIG. 6 illustrates in cross-sectional side view the example of FIG. 1, the float valve being in upright configuration and closed, the float valve being partially or fully submerged, the auxiliary float member floating on liquid medium.

FIG. 7 illustrates in cross-sectional side view the example of FIG. 1, the float valve being in inverted configuration and closed, the float valve being partially or fully submerged.

FIG. 10 illustrates in cross-sectional side view an alternative variation of the example of FIG. 3.

FIG. 11 illustrates in cross-sectional side view n alternative variation of the example of FIG. 1, the float valve being in upright configuration and open, the float valve not being submerged.

FIG. 12 illustrates in cross-sectional side view the example of FIG. 11, the float valve being in upright configuration and open, the float valve being partially submerged, the auxiliary float member floating on liquid medium.

DETAILED DESCRIPTION

Figure 8A:
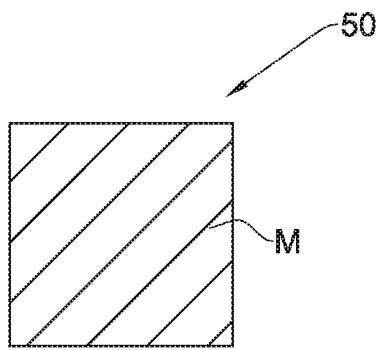
FIG. 8(a) illustrates in cross-sectional side view an example of the auxiliary float member of the example of FIG. 1.

Referring to FIG. 1, a float valve according to a first example of the presently disclosed subject matter, and designated with the reference numeral 10, comprises a housing 12, float assembly 60, and auxiliary float member 50. The float assembly 60 comprises primary float member 70 and spring element. In this and other examples the spring element is in the form of coiled spring 80, in which the coiled spring 80 is configured for providing a biasing spring force to the primary floating member 70, as will become clearer below. In alternative variations of these examples the spring element can comprise any suitable configuration, in particular a mechanical configuration, for example in the form of a resilient member that is configured for providing a biasing spring force to the primary floating member 70.

The float valve includes a fluid outlet port 24, and duct portion 23 is provided in fluid communication with the fluid outlet port 24. In alternative variations of this example, the float valve can include more than one fluid outlet port, for example two or more than two fluid outlet ports.

While in this example the housing 12 is cylindrical, in alternative variations of this example the housing can instead have any other suitable shape or cross section, for example an elliptical or polygonal cross-section.

In this example, and as will become clearer herein, the float valve 10 is configured for use as an over filling interdiction valve and/or as a roll over valve (ROV), and/or as a combination roll over valve (CROV). However, in alternative variations of this example the float valve 10 is instead configured as a filling level vent valve (FLVV), or as a combination filling level vent valve (CFLVV), or as a filing level valve (FLV), or as a combination filing level valve (CFLV).

The float valve 10 is attachable, via an upper portion thereof, to an upper portion of a fuel tank 16, for example the top wall of the fuel tank 16. Such attachment, in this example, is from an outside of the tank via an opening 11 in the tank upper wall (FIG. 1); however, in alternative variations of this example the float valve can instead be attached to an underside of the tank upper wall, within the tank. In any case, such attachment can be accomplished by any one of several methods as known per se in the art, for example by heat welding or mechanical attachments (e.g., clips, riveting, and so on). When thus attached, the housing 12 extends into the internal volume V of the fuel tank 16.

In refueling mode, the volume V can be filled with fuel F, and the float valve 10 operates to allow fuel vapor to vent out of the tank 16 via fluid outlet port 24. The float valve 10 further operates to selectively close the fluid outlet port 24 to prevent spillage of fuel when the float valve 10 is submerged, for example to prevent overfilling the tank 16. The float valve 10 also operates to vent the tank 16 as fuel level in the tank 16 is depleted during operation of the vehicle engine.

In general operation of the float valve 10, the float valve 10 further operates (or, in some alternative variations of this example alternatively operates) to selectively prevent spillage of fuel via fluid outlet port 24 in conditions in which the float valve is partially or fully submerged in the fuel, and potentially could otherwise result in fuel leakage through the valve. Such conditions can include, for example, roll over of the tank (e.g. when a vehicle (not shown), for example a road vehicle, in which the tank is installed rolls over), tilting of the fuel tank (for example the vehicle travelling uphill or downhill), or when fuel is moving within the tank (for example liquid sloshing occurring in the tank) causing crests and troughs in the level of fuel in the tank.

The housing 12 defines an inner chamber 18 having one or a plurality of fluid inlet ports 20 provided at or near a bottom end 14 of the housing 12 and/or at the sides of the housing 12, while the fluid outlet port 24 is provided at a top end of the inner chamber 18.

In at least this example, the fluid inlet ports 20 and the outlet port 24 have significantly large cross-sections so as to allow evacuation of fuel vapor at high flow rates when the float valve 10 is in open configuration.

Primary float member 70 has an outer peripheral wall 72 joined at the top end 71 thereof to an upper end wall 75, and the bottom end 76 is open, thereby defining an open-ended float chamber 77. While in this example the peripheral wall 72 is cylindrical, in alternative variations of this example the peripheral wall 72 can instead have any other suitable shape or cross section, for example an elliptical or polygonal cross-section. While in this example the peripheral wall 72 has a constant or uniform cross section along the longitudinal axis AA thereof, in alternative variations of this example the peripheral wall 72 can instead have a cross-section having a size and/or shape that decreases or decreases along the longitudinal axis AA.

The float assembly 60, including primary float member 70 and coiled spring 80, is configured for enabling the primary float member 70 to assume a floating configuration on a liquid medium when the float valve 10 is in the normal (upright) orientation (see for example FIG. 3), also interchangeably referred to herein as the upright configuration. The liquid medium (also interchangeably referred to herein as the "working fluid") is, in this and other examples, liquid fuel F, in particular of the type that is used for filling the tank 16. In the aforesaid floating configuration, the primary float member 70 is not fully submerged in the liquid medium. Rather, primary float member 70 remains partially submerged, wherein the buoyancy provided by virtue of an air pocket (typically filled with air and/or fuel vapor) that gets trapped in the open float chamber 77 plus the biasing spring force provided by the coiled spring 80 together allow for at least an upper portion 65 of the primary float member 70 to project above the level of liquid medium surrounding the primary float member 70.

It is to be noted that in some examples of the presently disclosed subject matter the primary float member 70, in the absence of coiled spring 80 but including the air pocket in the open float chamber 77, does not float on the liquid medium and instead becomes completely submerged in the liquid medium, while in other examples of the presently disclosed subject matter the primary float member 70, in the absence of coiled spring 80 but including the air pocket in the open float chamber 77, does float on the liquid medium.

On the other hand, in at least this example, the float assembly 60, including primary float member 70 and coiled spring 80, is also configured for not providing the aforesaid floating configuration on the liquid medium, in particular fuel F, when the float valve 10 is in the roll-over (inverted) orientation of FIG. 7 (also interchangeably referred to herein as the inverted configuration) and the float chamber 77 is now filled with the liquid medium, in particular with fuel F, rather than fuel vapor or air.

The outlet port 24 defines a valve seat 22, and the primary float member 70, in particular the upper end wall 75 thereof, comprises a resilient sealing member 79, adapted for selective sealing engagement with the valve seat 22 of housing 12. The sealing member 79 is provided on the aforesaid upper portion 65 of the primary float member 70, so that the sealing member 79 projects above the level of liquid medium surrounding the primary float member 70 when the float assembly 60 is in the floating configuration.

The primary float member 70 is reciprocally movable within the inner chamber 18 in directions parallel to or coaxial with longitudinal axis AA.

The coiled spring 80 is received within float chamber 77, such that a top end of the coiled spring 80 abuts an underside of the upper end wall 75, while the bottom end of the coiled spring 80 abuts the bottom end 14 of housing 12. The coiled spring 80 is pre-compressed to a predetermined compression (thereby storing therein potential energy) and is biased to provide a biasing spring force to urge the primary float member 70 upwardly away from the bottom end 14 and towards the fluid outlet port 24, as will become clearer below.

Optionally, primary float member 70 can be provided with projections (not shown) that are slidingly received within slots (not shown) provided on the inside of the inner chamber 18, enabling on the one hand reciprocal axial movement of the primary float member 70 within the inner chamber 18, while preventing relative rotation between the primary float member 70 and the inner chamber 18. Such a feature can be of particular use, for example, in at least some alternative variations of the illustrated example in which the resilient sealing member 79 is in the form of a flexible closure membrane strip, anchored, at one end thereof, to an inclined support surface formed on the top surface of the upper end wall 75, and wherein the valve seat 22 comprises an inclined bottom surface that is inclined in a parallel manner to the inclined support surface. In such a case, the prevention of relative rotation between the primary float member 70 and the inner chamber 18 can ensure correct positioning of the inclined surface and the flexible closure membrane strip with respect to the inclined bottom surface of the valve seat 22. Alternatively, other arrangements can optionally be provided for prevention of relative rotation between the primary float member 70 and the inner chamber 18.

The float valve 10, and in particular the float assembly 60, is designed such that when the full upthrust (i.e., full buoyancy forces) acts on the primary float member 70 (as a result of the primary float member 70 being freely submerged (i.e., fully or partially submerged, but sufficiently submerged such that the maximum upthrust is acting on the primary float member 70) in the liquid medium, this upthrust together with the biasing spring force provided by the coil spring 80 are together sufficiently greater than the weight of the primary float member 70, to thereby allow the float member to assume the floating configuration. The aforementioned full upthrust can be defined as the minimum upthrust or buoyancy forces acting on the primary float member 70 and that correspond to the submerged volume of the primary float member 70 plus at least a threshold volume of trapped air/vapor in the float chamber 77 of the primary float member 70.

The primary float member 70 is reciprocally movable within the inner chamber 18 in directions parallel or coaxial with longitudinal axis AA, between a lowermost position (FIG. 1) in which the fluid outlet port 24 is open (corresponding to the open configuration of the float valve), and an uppermost position (FIGS. 4, 5, 6) in which the resilient sealing member 79 is sealingly engaged with the valve seat 22 thereby closing the fluid outlet port 24 (corresponding to the closed configuration of the float valve).

The auxiliary float member 50 is configured for floating on the liquid medium, in particular fuel F (in particular, of the type that is used for filling the tank 16) irrespective of whether the float valve 10 is in the normal orientation (upright configuration) of FIGS. 1 to 6, or in the roll-over orientation (inverted configuration) of FIG. 7, or any other angular disposition therebetween.

Auxiliary float member 50 is accommodated in the float chamber 77, and is freely and reciprocally ably movable within the inner chamber 18, and in particular within the float chamber 77 in this example, in directions parallel to or coaxial with longitudinal axis AA, between a lowermost position (FIGS. 1, 7) in which the auxiliary float member 50 is resting on the bottom end 14, and an uppermost position (FIG. 5) in which the auxiliary float member 50 is in abutment with the underside of the upper end wall 75, the position of the upper end wall 75 being variable with respect to the inner chamber 18 according to the axial position of the primary float member 70 with respect to the inner chamber 18. In particular, the float member 50 is freely and reciprocally displaceable within the float chamber 77.

Unless otherwise specified, the terms "uppermost position", "lowermost position", "upper", "lower", and so on, are used herein generally in relation to the float valve being in the "upright configuration", and unless otherwise specified these terms are retained even when the float valve is in the inverted configuration, to avoid confusion.

Figure 9A:
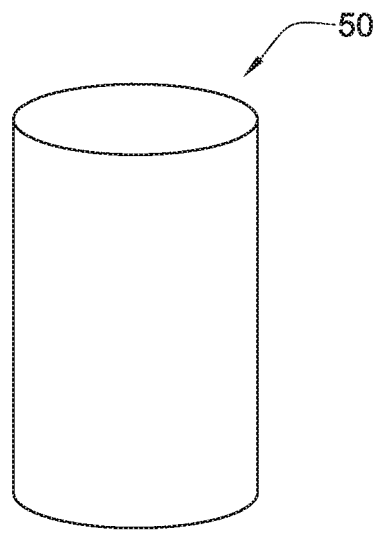
FIG. 9(a) illustrates in isometric view an example of the auxiliary float member of the example of FIG. 1.
Figure 9B:
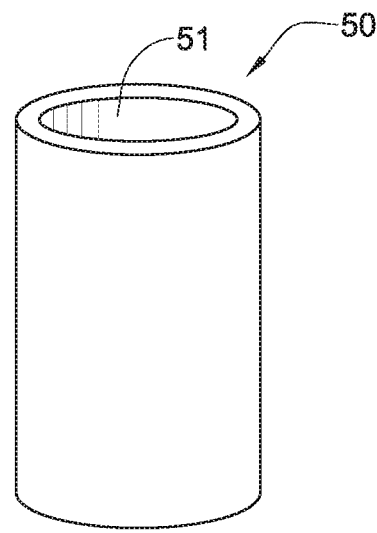
FIG. 9(b) illustrates in isometric view another example of the auxiliary float member of the example of FIG. 1.
Figure 9C:
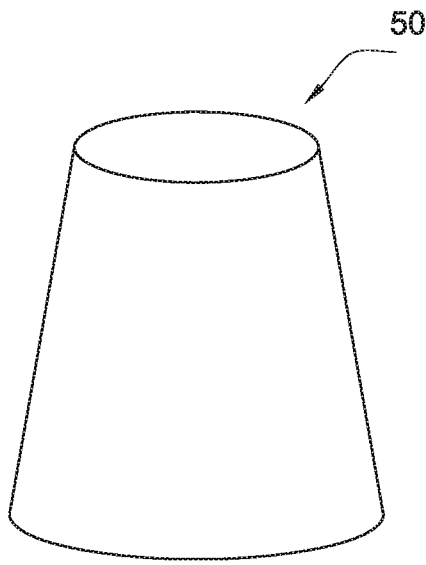
FIG. 9(c) illustrates in isometric view another example of the auxiliary float member of the example of FIG. 1.

Referring to FIGS. 9(a) and 9(b), while in this example the auxiliary float member 50 is cylindrical, in alternative variations of this example the auxiliary float member 50 can instead have any other suitable shape or cross section, for example an elliptical or polygonal cross-sectional shape. While in this example the auxiliary float member 50 has a constant or uniform cross section along the longitudinal axis AA, in alternative variations of this example the auxiliary float member 50 can instead have a cross-section that decreases or decreases in size and/or changes shape along the longitudinal axis AA. Referring to FIGS. 9(a) and 9(b), the auxiliary float member 50 can have a frusto-conical form, for example.

Figure 9D:
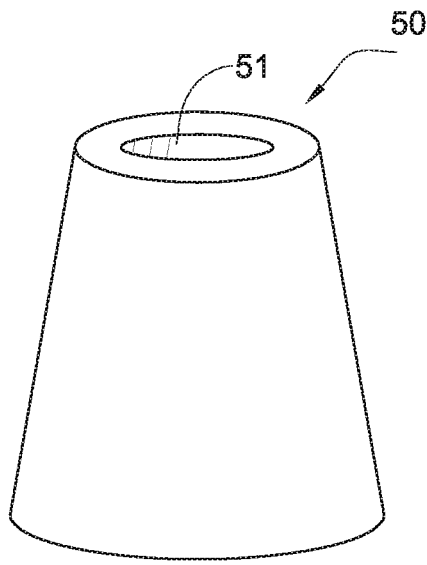
FIG. 9(d) illustrates in isometric view another example of the auxiliary float member of the example of FIG. 1.

In this example, the auxiliary float member 50 is concentrically received radially inwardly of the coiled spring 80, and thus the windings of the coiled spring 80 are radially disposed outwardly away from the auxiliary float member 50. However, and referring to FIGS. 9(b) and 9(d) and also FIG. 10, in alternative variations of this example, the opposite can be the case, and the coiled spring 80 can instead be received within a central lumen 51 formed in the auxiliary float member 50—in such a case the auxiliary float member 50 can be, for example, in the form of a Taurus, ring or other annular form, radially surrounding the windings of the coiled spring 80.

In the examples disclosed herein, the auxiliary float member 50 is configured with having an overall density that is less than the density of the fuel F, allowing the auxiliary float member 50 to float on a fuel surface SF regardless of the orientation thereof with respect to the fuel surface SF. For example, this overall density can be in the range about 0.16 kg/m³ to 0.60 kg/m³, or in the range about 0.16 kg/m³ to 0.65 kg/m³, and in particular between range about 0.20 kg/m³ to about 0.40 kg/m³ for use with fuel F, for example including one or more of petrol, diesel, flexfuel, biofuels, etc.

In the illustrated example of FIG. 1, and referring also to FIG. 8(a), the auxiliary float member 50 is formed as a solid body of low density material M, for example some plastics, nitrile rubber (NBR), wood, cork, and so on.

Figure 8B:
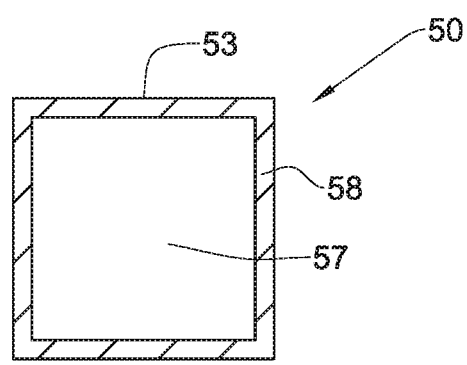
FIG. 8(b) illustrates in cross-sectional side view another example of the auxiliary float member of the example of FIG. 1.

In alternative variations of this example, and referring also to FIG. 8(b) the auxiliary float member 50 can be made as a sealed hollow body 53, including an outer skin 58 defining an internal volume 57 that can be filled with very low density material (for example air or another gas, or a foam, or a very low density liquid—as compared with the density of the fuel F) or enclosing a vacuum, and such that there is no fluid communication between this internal volume 57 and an outside of the auxiliary float member 50, and such that the overall density of the auxiliary float member 50 is significantly less than the density of the fuel F.

Thus, the auxiliary float member 50 is configured to always provide a net upthrust (i.e. an upthrust or buoyancy force that exceeds the weight of the auxiliary float member 50) regardless of the orientation of the auxiliary float member 50 with respect to the fuel surface SF, and thus regardless of the orientation of the float valve 10. This thereby ensures that the auxiliary float member 50 always floats on a fuel surface, regardless of the orientation of the auxiliary float member 50 with respect to the fuel surface (i.e., whether upright or inverted, for example), and thus regardless of the orientation of the float valve 10.

In contrast, the float assembly 60 is configured to provide a net upthrust to the primary float member 70 to provide the floating configuration when the float valve 10 is in the normal orientation (upright configuration) of FIG. 1 and the float chamber 77 traps at least the threshold volume of air and/or fuel vapor, while not providing any significant net upthrust that would otherwise provide a floating configuration to the primary float member 70 when the float valve 10 is in the roll-over orientation (inverted configuration) of FIG. 7 (and the float chamber 77 can possibly now be filled with fuel F). Thus the primary float member 70 floats on a fuel surface when in the upright position and the float chamber 77 is concurrently partially or fully filled with gas or vapor (to provide at least the threshold volume of trapped air/vapor), but sinks below the fuel surface if the primary float member 70 is in an inverted position with respect to the fuel surface and particularly if the float chamber is partially of fully filled with liquid fuel F. Thus, the net force vector acting on the primary float member 70 is dependent on the orientation of the primary float member 70 with respect to the fuel surface and on what material the float chamber 77 is concurrently filled with.

According to an aspect of the presently disclosed subject matter, the float valve 10 operates to prevent leakage of fuel therethrough under conditions in which cause the float valve 10 to become fully or partially submerged in the fuel F, while in the absence of such conditions, i.e. when the float valve 10 is no longer submerged in fuel F, or is submerged only to a small degree, such that there is no risk of leakage of fuel therethrough, the float valve operates to allow venting of the fuel tank therethrough.

One such condition can occur in refilling mode of the tank 16, in which the float valve 10 operates in refilling mode as follows.

Referring again to FIG. 1, the tank 16 is partially filled with fuel F to fuel level SF. Alternatively the tank can be empty of fuel F. In either case, the fuel level SF does not reach the bottom end 14 of housing 12.

In this position there is no net upthrust acting on the primary float member 70 or on the auxiliary float member 50. It is to be noted that herein the term "upthrust" is applied exclusively with respect to the liquid fuel F or any other liquid medium with which the tank is filled with, and thus excludes and disregards any nominal buoyancy or upthrust effects due to the atmosphere or due to fuel vapor or other gases in the fuel tank.

On the other hand, gravitational forces (weight) act on each one of the primary float member 70 and on the auxiliary float member 50. Furthermore the spring bias of the coil spring 80 attempts to apply an upward biasing spring force to the primary float member 70, i.e. a biasing force towards the outlet port 24, in a direction opposed to gravity. However, the coil spring 80 is designed such that the biasing spring force provided thereby is insufficient by itself to overcome the weight of the primary float member 70 in the absence of the upthrust provided as a result of the aforementioned threshold volume of trapped air/vapor, and the primary float member 70 thus assumes its lowermost position, seated on the bottom end 14 of housing 12. Similarly, and being acted upon only by its own weight (again, disregarding any buoyancy effects due to the atmosphere or due to fuel vapor or other gases in the fuel tank) the auxiliary float member 50 also assumes its lowermost position, seated on the bottom end 14 of housing 12. Under these conditions the float valve 10 is in the fully open configuration, in which the fluid outlet port 24 is open and vapor is free to flow through the float valve 10, via fluid inlet ports 20, fluid outlet port 24 and duct 23, to outside of the tank 16, typically to a vapor treating device (not shown), for example an activated carbon canister. The configuration of FIG. 1 is consistent with conditions of daytime or nighttime, and can cover most or all the environmental conditions for which the fuel tank 16 and float valve 10 are designed to operate in.

Referring now to FIG. 2 and FIG. 3, as the valve 10 becomes partially submerged, the fuel level within the tank 16 eventually rises just above the fluid inlet ports 20. At this point fuel F enters the inner chamber 18 via the fluid inlet ports 20. Under typical daytime conditions, the float chamber 77 is still devoid of fuel F in liquid form, and is typically filled with fuel vapor and/or air, while also accommodating the auxiliary float member 50 therein. The fuel level (i.e. the level of the fuel surface SF) outside the float valve 10, and also inside, in particular the inner chamber 18, is still below buoyancy level of the float assembly 60 (and in this example the fuel level is not at "design full tank" level DFT), and only intermediate or partial upthrust act on the primary float member 70. This partial upthrust is less than the full upthrust forces that can act on the primary float member 70 when the primary float member 70 is freely floating on a fuel surface SF. The partial upthrust at this stage is insufficient to overcome the weight of the primary float member 70, even with the assistance of biasing spring force provided by the coiled spring 80, and thus the primary float member 70 remains at its lowermost position seated on the bottom end 14. Thus, under the conditions illustrated in FIG. 2, the float valve 10 remains in the fully open configuration, and the auxiliary float member 50 also remains seated on the bottom end 14, since only the weight of the auxiliary float member 50 acts thereon.

At some point during the fuel level rise outside the float valve 10, the level of fuel F within the inner chamber 18, is sufficient such that the upthrust acting on the primary float member 70 and the biasing spring force provided by the coiled spring 80 are together sufficient to overcome the weight of the primary float member 70, which thus adopts the floating configuration in which upper portion 65 projects above the surface of the fuel F within the inner chamber 18, and thus the primary float member 70 becomes spaced from its lowermost position seated on the bottom end 14. Thus, under the conditions illustrated in FIG. 3, the float valve 10 still remains in the fully open configuration, and the auxiliary float member 50 also remains seated on the bottom end 14 (since only the weight of the auxiliary float member 50 acts thereon, and the level of fuel in the immediate vicinity of the auxiliary float member 50 is lower than in the inner chamber 18, being determined by the volume of air/vapor in the float chamber 77) while the primary float member 70 is displaced towards the valve seat 22.

As the fuel tank 16 continues to be filled with fuel F, the fuel level (i.e. the level of the fuel surface SF) outside the float valve 10 eventually reaches a desired maximum level, corresponding to the "design full tank" level DFT, in which there is some headspace HD remaining above the fuel surface SF in the tank 16. At this point, more fuel has entered the inner chamber 18 via the fluid inlet ports 20, sufficiently to enable the full upthrust to be applied to the primary float member 70. Since the float valve 10 is designed such that the full upthrust acting on the primary float member 70 together with biasing spring force provided by the coil spring 80 are greater than the weight of the primary float member 70, the primary float member 70 rises within the float chamber 77, eventually to the uppermost position of the primary float member 70, thereby sealingly engaging the resilient sealing member 79 with the valve seat 22 (FIG. 4). Under these conditions the float valve 10 is in the closed configuration, in which the fluid outlet port 24 is closed, and vapor (as well as liquid fuel F) is prevented from flowing out of the tank 16 via the float valve 10 to outside of the tank 16.

At this point the fuel tank 16 cannot be filled any further with fuel F, and the headspace HD is maintained. Typically, in the closed configuration any further attempt to continue filling the bank 16 with fuel causes a pressure build-up within the volume of the tank 16, which is sensed by the fuel filling mechanism (not shown) and which subsequently cuts-off further refueling.

Typically, while fuel F does not penetrate at all, or to any significant degree, into the float chamber 77, a bottom part of the inner chamber 18 does get filled with fuel, up to the level of the lower edge 78 of the primary float member 70. This level of fuel within the inner chamber 18 is insufficient to urge the auxiliary float member 50, via the buoyancy thereof, into abutment with the upper end wall 75. Thus, under the conditions illustrated in FIG. 4, the auxiliary float member 50 remains seated on the bottom end 14 since only the weight of the auxiliary float member 50 acts thereon.

Referring to FIG. 5, this figure illustrates conditions in which the tank 16 is being filled up to the "design full tank" level DFT, or in which the tank 16 is already filled up to the "design full tank" level DFT, with fuel F, and in which the float chamber 77 is also full of fuel F. Such conditions can occur, for example, under a range of environmental conditions in which the environmental temperature can drastically fall, for example at night when the environmental temperature can be significantly lower than during the day. Under these conditions, the net upthrust acting on the primary float valve 70 is reduced or eliminated, so that the float assembly 60 by itself cannot close the valve. On the other hand, the fuel F within the float chamber 77 enables upthrust to be generated and applied to the auxiliary float member 50, which as a result thereof is now urged to an uppermost position thereof, in abutment with the upper end wall 75 of the primary float member 70. Furthermore, such abutment results in the upthrust generated by the auxiliary float member 50 to be now applied to the primary float member 70, and together with the biasing spring force provided by the coiled spring 80 are at least equal to or greater than the weight of the primary float member 70. This results in the primary float member 70 being urged against or maintained at the uppermost position thereof, maintaining the float valve 10 in the closed position.

It is to be noted that the upthrust generated by the auxiliary float member 50 is unaffected by the orientation of the float valve 10, in particular by whether the float valve is in the upright configuration or the inverted configuration or at any other angular orientation inbetween, nor in practical terms by the environmental conditions (for example environmental temperature) that can affect the ability of the float chamber 77 to retain the aforesaid threshold volume of trapped air/vapor.

Thus, the reciprocally movable auxiliary float member 50 provides the primary float member 70 with the required additional buoyancy force or upthrust, under conditions in which the primary float member 70 cannot provide sufficient upthrust, which together with the biasing spring force can urge the primary float member 70 to the uppermost position thereof to provide the closed configuration, and thereby prevent the fuel tank 16 from being over filled past the "design full tank" level DFT or from spilling fuel.

In this manner the float valve 10 operates as an overfilling interdiction valve.

It is to be noted that under the conditions illustrated in FIG. 5, but in the absence of the auxiliary float member 50, the weight of the primary float member 70 (with a relatively low upthrust under these conditions to counter the weight) would then overcome the biasing spring force provided by the coiled spring 80, thereby allowing the primary float member 70 to become spaced away from the fluid outlet port 24, and returning the float valve 10 to the open configuration, allowing leakage of fuel.

FIG. 6 illustrates a similar situation to that of FIG. 5, with the main difference being that the float chamber 77 is significantly but only partially filled with fuel F. Under the conditions illustrated in FIG. 6, even though the respective full buoyancy forces are acting on the auxiliary float member 50, the level of fuel within the float chamber 77 is insufficient to urge the auxiliary float member 50 into abutment with the upper end wall 75, and thus these forces cannot be applied to the float chamber 77. On the other hand, by virtue of the fact that the float chamber 77 is now partially filled with fuel, the net buoyancy forces acting now on the primary float member 70 are now less than the aforesaid full buoyancy forces, but nevertheless still sufficient to overcome the weight of the primary float member 70, when coupled with the biasing spring force provided by the coiled spring 80.

In at least this example, the float valve 10 is designed such that at the level of fuel within the float chamber 77 that is required to just bring the auxiliary float member 50 into contact with the upper end wall 75 (but not yet sufficient to transmit thereto the net upthrust acting on the auxiliary float member 50), the primary float member 70 can still provide sufficient net upthrust so that, together with the biasing spring force provided by the coiled spring 80, the float valve 10 remains in the closed configuration. This level of fuel within the float chamber 77 is referred to herein as the minimum threshold level, and the aforementioned threshold trapped volume of gas in the float chamber 77 can be defined as the volume of the space within the float chamber 77 above this minimum threshold level, i.e., that is enclosed between the minimum threshold level and the top wall 75 in the float chamber 77.

Furthermore the float valve 10 is also designed such that, as the level of fuel within the float chamber 77 is further increased from the minimum threshold level, and thereby concurrently decreasing the upthrust acting directly on the primary float member 70, the auxiliary float member 50 generates and applies its net upthrust to the primary float member 70 to compensate, thereby ensuring that the float valve 10 remains in the closed configuration.

It is to be noted that as fuel F begins to be pumped out of the tank 16 (for example, for running an engine), the fuel level SF drops below the "design full tank" level DFT, and allowing the float valve 10 to again adopt the open configuration, enabling the tank 16 to be vented.

It is further to be noted that there are other such conditions, in which the tank 16 is not full and the fuel level SF is below the "design full tank" level DFT, but nevertheless the float valve 10 becomes fully or partially submerged in the fuel F. Under such conditions, the float valve 10 operates to prevent leakage of fuel therethrough, while allowing the valve 10 to vent fuel vapor therethrough when such conditions terminate. Such conditions can include other situations in which the float valve is in the upright configuration, or close thereto, and can include, for example, tilting of the fuel tank (for example the vehicle travelling uphill or downhill), or as a result of acceleration or deceleration of the fuel tank (i.e., the vehicle accelerating or decelerating), or when fuel is moving within the tank (for example liquid sloshing occurring in the tank) such as to causing crests and troughs in the level of fuel in the tank, wherein the crests cause such submersion of the float valve.

In such conditions, whenever the float valve 10 becomes sufficiently submerged that it is necessary to close the outlet port 24 to prevent fuel leakage, then the float valve 10 operates according to either (a) or (b) below:

(a) The net upthrust generated by the primary float member 70 plus the biasing spring force provided by the coil spring 80 are sufficient to urge the primary float member 70 towards the top wall 75 and ensure sealing engagement between the sealing member 79 and the valve seat 22—corresponding to the operation of the float valve 10 illustrated in FIG. 4 or in FIG. 6 for example and described herein, *mutatis mutandis*.

(b) The net upthrust generated by the primary float member 70 plus the biasing spring force provided by the coil spring 80 are not sufficient to urge the primary float member 70 towards the top wall 75—for example the float chamber 77 is filled with fuel rather than air or fuel vapor (or there is less air/vapor in the float chamber 77 than the aforesaid threshold trapped volume)—in which case the auxiliary float member 50 provides its net upthrust to further urge the primary float member 70 towards the top wall 75 and thereby ensure sealing engagement between the sealing member 79 and the valve seat 22—corresponding to the operation of the float valve 10 illustrated in FIG. 5 for example and described herein, *mutatis mutandis*.

There are other such conditions, in which the float valve 10 operates to prevent leakage of fuel therethrough, while allowing the valve 10 to vent fuel vapor therethrough when such conditions terminate, but in which the float valve is not in the upright configuration, but rather in the inverted configuration or close thereto.

One such situation is roll-over. Referring to FIG. 7, this figure illustrates a roll-over (or inverted) configuration of the float valve 10, under conditions in which the tank 16 has been inverted, for example due to roll-over of the vehicle in which the tank is installed. Under these conditions in which the float valve 10 is fully or partially inverted, the weight of the primary float member 70 together with the biasing spring force provided by the coiled spring 80 act along the same direction and urge the primary float member 70 towards the fluid outlet port 24 rapidly, thereby sealingly engaging the resilient sealing member 79 with the valve seat 22. It is to be noted that since the primary float member is now partially or fully inverted, the float chamber 77 can also fill with fuel F and thus greatly diminish upthrust or buoyancy forces acting on the primary float member 70 which can further assist in accelerating the primary float member 70 towards the fluid outlet port 24 to close the fluid port outlet 24 even faster.

Under these rollover conditions the float valve 10 is in the closed configuration, and prevents egress of liquid fuel F or fuel vapor from the fuel tank via the fluid outlet port 24. It is to be noted that operation of the float valve 10 in the aforesaid roll-over configuration is not dependent on how much fuel F is present in the tank 16, and enables the fluid outlet port 24 to be closed off quickly irrespective of whether the tank 16 is full, partially full, or empty of fuel F.

It is also to be noted that in the aforesaid roll-over configuration, a net upthrust continues to act on the auxiliary float member 50 such as to urge the auxiliary float member 50 in an upward direction (i.e. in a direction opposed to gravity), and in this configuration thus displaces the auxiliary float member 50 along the float chamber 77 in a direction away from the upper end wall 75. Thus, in the roll-over configuration the net upthrust acting on the auxiliary float member 50 does not get to be applied to the primary float member 70, which could otherwise interfere with operation of the primary float member 70 to close the float valve 10 in the aforesaid roll-over configuration.

In this manner the float valve 10 thus also operates as a roll-over valve.

Referring to FIG. 10, in alternative variations of the above examples, the float chamber 77 can be divided into an outer annular float chamber 69 separated from an inner float chamber 68 via inner peripheral wall 62. The coiled spring 80 can be accommodated in this inner float chamber 68, while the auxiliary float member 50 (in the form as illustrated in FIG. 9(*b*) or 9(*d*), for example) is reciprocally movable within the annular float chamber 69.

An alternative variation of the first example of the float valve 10 is illustrated in FIGS. 11 to 15, in which the primary float member 70 is replaced with a similar float member 70', *mutatis mutandis*, but having an opening 74 at the top wall 75 of the primary float member 70'; the float valve in the example of FIGS. 11 to 15 is generally designated with reference numeral 10'.

The opening 74 provides open fluid communication between the float chamber 77 and an outside of the primary float member 70', irrespective of the orientation of the primary float member 70'.

In alternative variations of this example, the primary float member 70' can instead have more than one said opening 74 at the top wall 75, and/or one or more openings on the side walls 72, each one of these openings providing open fluid communication between the float chamber 77 and an outside of the primary float member 70'.

Thus, the example of the float valve 10' of FIGS. 11 to 15 differs from the example of the float valve 10 of FIGS. 1 to 7, 10, mainly in that the float chamber 77 of the latter can trap a volume of air or fuel vapor in at least some circumstances, thereby providing a net upthrust, whereas in the former the respective float chamber 77 does not allow any air or fuel vapor to be trapped therein.

Thus, in the example of example of FIGS. 11 to 15 the respective float chamber 77 is vented via opening 74 and there is therefore no contribution to upthrust that is otherwise provided by the volume of trapped air/vapor of the example of FIGS. 1, 2, 3, 4, 6, such a trapped volume being absent in the primary float member 77' of the example of FIGS. 11 to 15. In other words, since the primary float member 70' is always vented, the float chamber 77 can also fill with fuel F in the upright configuration, and thus greatly diminish upthrust or buoyancy forces acting on the primary float member 70' as compared with the primary float member 70.

Referring to FIG. 11, this corresponds to the configuration of FIG. 1, and the level of fuel SF is below the inlet ports 20. In this position there is no net upthrust acting on the primary float member 70' or on the auxiliary float member 50, while gravitational forces (weight) act on each one of the primary float member 70' and on the auxiliary float member 50. Furthermore the spring bias of the coil spring 80 attempts to apply an upward biasing spring force to the primary float member 70', i.e. a biasing force towards the outlet port 24, in a direction opposed to gravity. As will become clearer herein, this biasing force is insufficient to overcome the weight of the primary float member 70'.

Referring to FIG. 12, as the fuel level SF rises above the inlet ports 20, fuel begins to enter the float chamber 77, and the fuel level within the float chamber 77 rises nominally in the same manner as outside of the primary float member 70', as air/fuel vapor is vented out of the float chamber 77 via the opening 74. In FIG. 12, the level of fuel within the float chamber 77 has risen sufficiently such that the auxiliary float member 50 is now freely floating on the fuel, but is still spaced from the top wall 75 and thus not in contact with the top wall 75. In this configuration, the outlet port 24 is still open, and the float valve 10' is in the open configuration; furthermore, the primary float member 70' is still at its lowermost position, seated on the bottom end 14 of housing 12.

Figure 13:
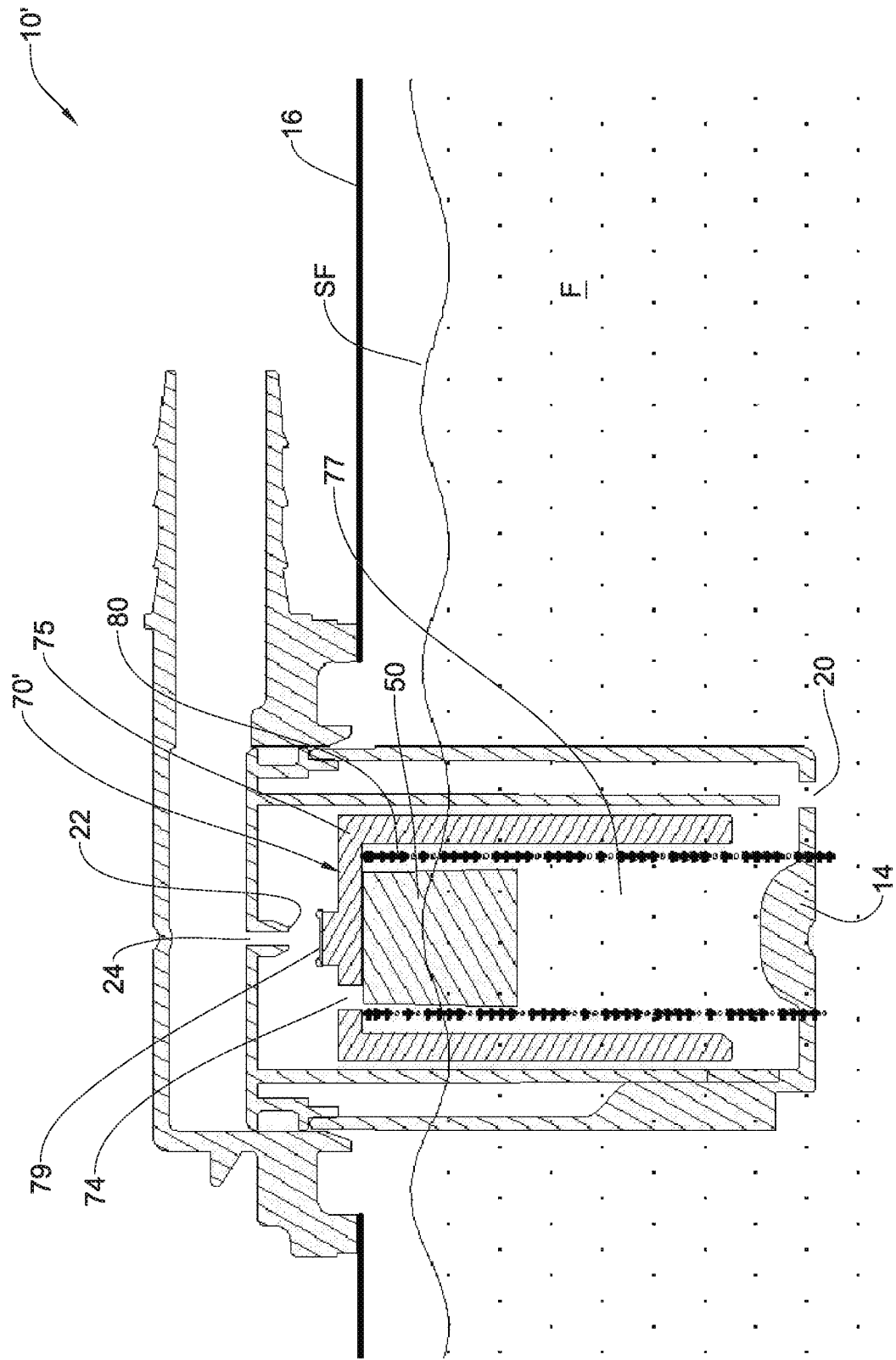
FIG. 13 illustrates in cross-sectional side view the example of FIG. 11, the float valve being in upright configuration and open, the float valve being partially submerged, the primary float member and the auxiliary float member floating on liquid medium.

Referring to FIG. 13, as the fuel level SF rises even further, the freely floating auxiliary float member 50 eventually abuts the top wall 75, and as the fuel level rises further, the upthrust provided by the auxiliary float member 50 is applied to the primary float member 70', which subsequently begins to rise with the fuel level, and away from its lowermost position, seated on the bottom end 14 of housing 12.

It is to be noted that in the example of FIGS. 11 to 15, the coil spring 80 is designed such that the biasing spring force provided thereby is insufficient by itself to overcome the weight of the primary float member 70' in the absence of the applied upthrust provided by the auxiliary float member 50. On the other hand, the biasing force of the coiled spring 80 together with the upthrust provided by the auxiliary float member 50 overcome the weight of the primary float member 70' (when the float valve 10' is in the upright configuration, and the auxiliary float member 50 is floating and abutting against the primary float member 70'), and thus allow the primary float member 70' to approach the outlet port 24. It is to be noted that in this example the primary float member 70' does not provide a net upthrust when partially or fully submerged in the fuel.

Figure 14:
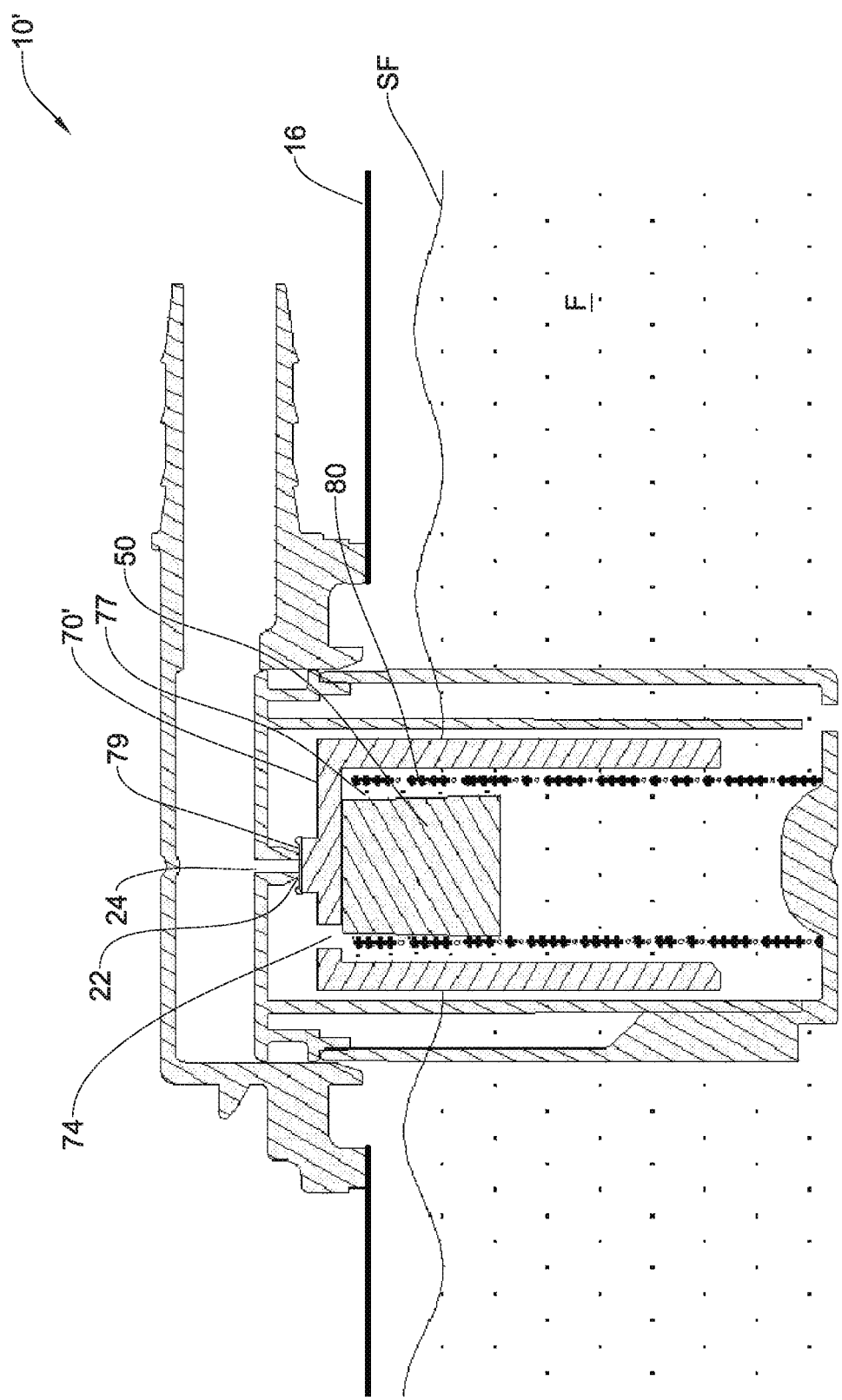
FIG. 14 illustrates in cross-sectional side view the example of FIG. 11, the float valve being in upright configuration and closed, the float valve being partially or fully submerged, the auxiliary float member providing upthrust to the primary float member.

Referring to FIG. 14, as the level of fuel SF increased further, the primary float member 70' rises within the float chamber 77, via the upthrust provided by the auxiliary flat member 50 plus the biasing spring force of the coiled spring 80, eventually to the uppermost position of the primary float member 70', thereby sealingly engaging the resilient sealing member 79 with the valve seat 22. Under these conditions the float valve 10' is in the closed configuration, in which the fluid outlet port 24 is closed, and vapor (as well as liquid fuel F) is prevented from flowing out of the tank 16 via the float valve 10 to outside of the tank 16.

Figure 15:
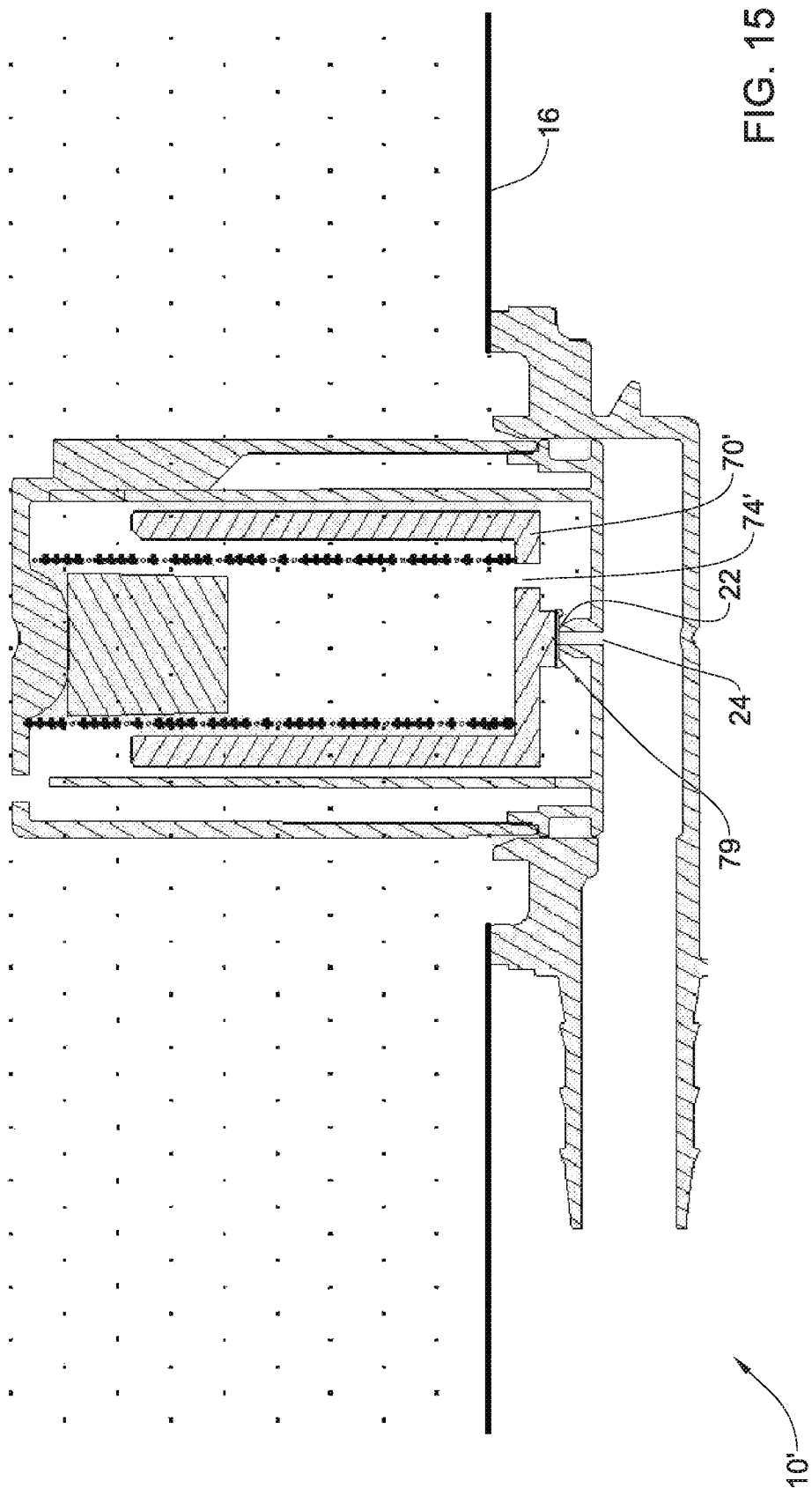
FIG. 15 illustrates in cross-sectional side view the example of FIG. 11, the float valve being in inverted configuration and closed, the float valve being partially or fully submerged.

Referring to FIG. 15, this figure illustrates a roll-over (or inverted) configuration of the float valve 10', under conditions in which the tank 16 has been inverted, for example due to roll-over of the vehicle in which the tank is installed, and corresponds to the configuration of FIG. 7. Under these conditions in which the float valve 10' is fully or partially inverted, the weight of the primary float member 70' together with the biasing spring force provided by the coiled spring 80 act along the same direction and urge the primary float member 70' towards the fluid outlet port 24 rapidly, thereby sealingly engaging the resilient sealing member 79 with the valve seat 22.

Under these rollover conditions the float valve 10' is in the closed configuration, and prevents egress of liquid fuel F or fuel vapor from the fuel tank via the fluid outlet port 24. It is to be noted that operation of the float valve 10' in the aforesaid roll-over configuration is not dependent on how much fuel F is present in the tank 16, and enables the fluid outlet port 24 to be closed off quickly irrespective of whether the tank 16 is full, partially full, or empty of fuel F. It is also to be noted that in the aforesaid roll-over configuration, a net upthrust continues to act on the auxiliary float member 50 such as to urge the auxiliary float member 50 in an upward direction (i.e. in a direction opposed to gravity), and in this configuration thus displaces the auxiliary float member 50 along the float chamber 77 in a direction away from the upper end wall 75. Thus, in the roll-over configuration the net upthrust acting on the auxiliary float member 50 does not get to be applied to the primary float member 70', which could otherwise interfere with operation of the primary float member 70' to close the float valve 10' in the aforesaid roll-over configuration.

Thus, also in the example of FIGS. 11 to 15, the auxiliary float member 50 is configured to always provide a net upthrust (i.e. an upthrust or buoyancy force that exceeds the weight of the auxiliary float member 50) regardless of the orientation of the auxiliary float member 50 with respect to the fuel surface SF, and thus regardless of the orientation of the float valve 10'. This thereby ensures that the auxiliary float member 50 always floats on a fuel surface, regardless of the orientation of the auxiliary float member 50 with respect to the fuel surface (i.e., whether upright or inverted, for example), and thus regardless of the orientation of the float valve 10'.

In contrast, the primary float member 70' does not have a floating configuration and provides no net upthrust when the float valve 10' regardless of the orientation of the primary float member 70' with respect to the fuel surface (i.e., whether upright or inverted, for example), and thus regardless of the orientation of the float valve 10', and the float chamber 77 cannot trap therein air or fuel vapor.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A float valve for use with a liquid medium, the float valve comprising:
    a housing defining at least one inlet port and at least one outlet port;
    a float assembly movable within said housing; and
    an auxiliary float member movable within said housing;
    wherein the float assembly comprises a primary float member, different from said auxiliary float member, and a spring element; the primary float member configured for closing said at least one outlet port when in abutment therewith independent of the auxiliary float member, the spring element being configured for providing a biasing spring force to the primary floating member in a direction towards said at least one outlet port;
    wherein said auxiliary float member is configured for providing a net upthrust force with respect to the liquid medium under submerged conditions irrespective of whether the float valve is in an upright configuration or in an inverted configuration; and
    wherein said primary float member comprises a float chamber configured for wholly accommodating said auxiliary float member therein.

2. The float valve according to claim 1, wherein said float chamber is open at a bottom end thereof and closed at a top end thereof.

3. The float valve according to claim 2, wherein said float assembly is configured for selectively operating in a first upright mode, wherein under said submerged conditions:
    in said first upright mode the float valve is in said upright configuration and the float assembly is configured for closing said at least one outlet port in the absence of any upthrust than can be provided by the auxiliary float member.

4. The float valve according to claim 3, wherein said float assembly is configured for selectively and alternately operating in said first upright mode, in said second upright mode, and in said inverted mode.

5. The float valve according to claim 2, wherein said float assembly is configured for selectively operating in a second upright mode, wherein under said submerged conditions:
    in said second upright mode the float valve is in said upright configuration, said float chamber is filled with the liquid medium at least past a threshold level, and said float assembly is configured for closing said at least one outlet port using said upthrust provided by the auxiliary float member.

6. The float valve according to claim 2, wherein said float assembly is configured for selectively operating in an inverted mode, wherein under said submerged conditions:
    in said inverted mode the float valve is in said inverted configuration and the float assembly is configured for closing said at least one outlet port in the absence of any upthrust than can be provided by the auxiliary float member.

7. The float valve according to claim 1, wherein said auxiliary float member is reciprocaly movable within said float chamber.

8. The float valve according to claim 1, wherein said auxiliary float member has an overall density lower than a density of the liquid medium.

9. The float valve according to claim 8, including one of the following:
    wherein the auxiliary float member is formed as a solid body made from one or more materials wherein said overall density of the auxiliary float member is lower than the density of the liquid medium;
    wherein the auxiliary float member is formed as a sealed hollow body including an outer skin defining an internal volume, and wherein there is an absence of fluid communication between said internal volume and an outside of the auxiliary float member, wherein said overall density of the auxiliary float member is lower than the density of the liquid medium;
    wherein the auxiliary float member is formed as a sealed hollow body including an outer skin defining an internal volume, and wherein there is an absence of fluid communication between said internal volume and an outside of the auxiliary float member, wherein said overall density of the auxiliary float member is lower than the density of the liquid medium, and, wherein the internal volume comprises a low density material; or
    wherein the auxiliary float member is formed as a sealed hollow body including an outer skin defining an internal volume, and wherein there is an absence of fluid communication between said internal volume and an outside of the auxiliary float member, wherein said overall density of the auxiliary float member is lower than the density of the liquid medium, and, wherein the internal volume comprises a low density material, and, wherein said low density material is any one of a gas, liquid, solid or foam having a material density significantly less than the density of the liquid medium.

10. The float valve according to any claim 1, including one of the following:
    wherein said primary float member, in the absence of said spring element and concurrently including an air pocket in said float chamber, is not buoyant with respect to the liquid medium;
    wherein said primary float member, in the absence of said spring element and concurrently including an air pocket in said float chamber, becomes completely submerged in the liquid medium; or
    wherein said primary float member, in the absence of said spring element and concurrently including an air pocket in the said float chamber is buoyant with respect to the liquid medium.

11. The float valve according to claim 1, wherein said spring element is in the form of a coiled spring.

12. A fuel tank for a vehicle, including the float valve of claim 1.

13. A vehicle including a fuel tank having the float valve of claim 1.

14. The vehicle of claim 13, wherein the vehicle includes a road vehicle.

15. The float valve according to claim 1, wherein said auxiliary float member accommodated in said float chamber.

16. A float valve for use with a liquid medium, the float valve comprising:
   a housing defining at least one inlet port and at least one outlet port;
   a float assembly movable within said housing; and
   an auxiliary float member movable within said housing;
   wherein the float assembly comprises a primary float member, different from said auxiliary float member, and a spring element; the primary float member configured for closing said at least one outlet port when in abutment therewith, the spring element being configured for providing a biasing spring force to the primary floating member in a direction towards said at least one outlet port;
   wherein said auxiliary float member is configured for providing a net upthrust force with respect to the liquid medium under submerged conditions irrespective of whether the float valve is in an upright configuration or in an inverted configuration; and
   wherein said primary float member comprises a float chamber accommodating said auxiliary float member; and
   wherein said float chamber is open at a bottom end thereof and further comprises at least one opening at a top end thereof.

17. The float valve according to claim 16, wherein said float assembly is configured for selectively operating in a first upright mode, wherein under said submerged conditions:
   in said first upright mode the float valve is in said upright configuration, said float chamber is filled with the liquid medium at least past a threshold level, and said float assembly is configured for closing said at least one outlet port using said upthrust provided by the auxiliary float member.

18. The float valve according to claim 17, wherein said float assembly is configured for selectively and alternately operating in said first upright mode, and in said inverted mode.

19. The float valve according to claim 16, wherein said float assembly is configured for selectively operating in an inverted mode, wherein under said submerged conditions:
   in said inverted mode the float valve is in said inverted configuration and the float assembly is configured for closing said at least one outlet port in the absence of any upthrust than can be provided by the auxiliary float member.

20. The float valve according to claim 16, wherein said float assembly, including said primary float member and spring element, is configured for enabling said primary float member to assume a floating configuration on a liquid medium when the float valve is in said first upright mode.

21. The float valve according to claim 20, including one of the following:
   wherein said float assembly, including said primary float member and said spring element, is further configured for not providing said floating configuration on the liquid medium, when the float valve is in said inverted mode;
   wherein said float valve is configured such that, when a maximum said upthrust acts on the primary float member, said maximum upthrust together with said biasing spring force provided by the spring element are together sufficiently greater than a weight of the primary float member, to thereby allow the float member to assume the floating configuration;
   wherein said float valve is configured such that, when a maximum said upthrust acts on the primary float member, said maximum upthrust together with said biasing spring force provided by the spring element are together sufficiently greater than a weight of the primary float member, to thereby allow the float member to assume the floating configuration, and, wherein said float valve is configured such that, when a maximum said upthrust acts on the primary float member, said maximum upthrust together with member, said maximum upthrust together with said biasing spring force provided by the spring element are together sufficiently greater than a weight of the primary float member, to thereby allow the float member to assume the floating configuration, and, wherein said maximum upthrust is a minimum upthrust force or buoyancy force acting on the primary float member corresponding to a submerged volume of the primary float member plus at least a threshold volume of air or vapor trapped in the float chamber of the primary float member.

* * * * *